US012256249B2

(12) United States Patent
Guo et al.

(10) Patent No.: US 12,256,249 B2
(45) Date of Patent: Mar. 18, 2025

(54) CONTROL CHANNEL MONITORING PROCEDURE

(71) Applicant: ZTE Corporation, Guangdong (CN)

(72) Inventors: Qiujin Guo, Guangdong (CN); Mengzhu Chen, Guangdong (CN); Jun Xu, Guangdong (CN); Xiaoying Ma, Guangdong (CN); Qiang Fu, Guangdong (CN); Jian Kang, Guangdong (CN)

(73) Assignee: ZTE Corporation, Guangdong (CN)

( * ) Notice: Subject to any disclaimer, the term of this patent is extended or adjusted under 35 U.S.C. 154(b) by 333 days.

(21) Appl. No.: 17/811,188

(22) Filed: Jul. 7, 2022

(65) Prior Publication Data
US 2022/0345922 A1 Oct. 27, 2022

Related U.S. Application Data

(63) Continuation of application No. PCT/CN2020/099167, filed on Jun. 30, 2020.

(51) Int. Cl.
H04W 24/08 (2009.01)
H04W 72/044 (2023.01)

(52) U.S. Cl.
CPC ......... *H04W 24/08* (2013.01); *H04W 72/044* (2013.01)

(58) Field of Classification Search
CPC ........... H04W 72/044; H04W 52/0219; H04W 52/0229; H04W 52/0216; H04W 48/12;
(Continued)

(56) References Cited

U.S. PATENT DOCUMENTS 8,830,848 B1 9/2014 Shetty et al.
2018/0332655 A1 11/2018 Ang et al.
(Continued)

FOREIGN PATENT DOCUMENTS

CN 110519853 A 11/2019
CN 110677887 A 1/2020
(Continued)

OTHER PUBLICATIONS

Ericsson, "DL Signals and Channels", 3GPP TSG-RAN WG1 Meeting #100-e, Tdoc R1-2000824 (Year: 2020).*
(Continued)

*Primary Examiner* — Phirin Sam
*Assistant Examiner* — Mang Boi Thawng
(74) *Attorney, Agent, or Firm* — Perkins Coie LLP

(57) ABSTRACT

The present application relates to methods, systems, and devices related to digital wireless communication, and more specifically, to techniques related to a control channel monitoring procedure. In one exemplary aspect, a method for wireless communication is disclosed. The method includes detecting, by a terminal, an occurrence of an event. The method also includes selecting, by the terminal, a monitoring configuration based on the occurrence of the event. The method also includes resetting or stopping, by the terminal, any of a first timer and/or a second timer based on the occurrence of the event. The method also includes monitoring, by the terminal, a control channel according to the selected monitoring configuration.

20 Claims, 12 Drawing Sheets

(58) Field of Classification Search
CPC .............. H04W 76/28; H04W 72/232; H04W 72/0446; H04W 72/0457; H04W 72/231; Y02D 30/70; H04L 5/0053; H04L 5/0094; H04L 27/26025

See application file for complete search history.

(56) References Cited

U.S. PATENT DOCUMENTS

| | | | |
|---|---|---|---|
| 2019/0158229 | A1 | 5/2019 | Wei et al. |
| 2019/0230590 | A1 | 7/2019 | Wu et al. |
| 2019/0306737 | A1 | 10/2019 | Kwak et al. |
| 2020/0077432 | A1 | 3/2020 | Xiong et al. |
| 2020/0195410 | A1* | 6/2020 | Li .................... H04L 1/1819 |
| 2020/0389874 | A1* | 12/2020 | Lin .................... H04L 5/0096 |
| 2020/0396684 | A1* | 12/2020 | Lin .................... H04W 52/0238 |
| 2021/0168715 | A1* | 6/2021 | Huang ............... H04W 24/08 |
| 2021/0360733 | A1* | 11/2021 | Bao .................. H04W 52/0216 |
| 2022/0140985 | A1 | 5/2022 | Li et al. |
| 2022/0183102 | A1* | 6/2022 | Feuersaenger ....... H04W 72/23 |
| 2022/0386373 | A1* | 12/2022 | Thyagarajan ....... H04L 27/0006 |
| 2023/0262599 | A1* | 8/2023 | Jung ................... H04L 5/0007 370/311 |

FOREIGN PATENT DOCUMENTS

| | | |
|---|---|---|
| CN | 110740025 A | 1/2020 |
| CN | 110876179 A | 3/2020 |
| CN | 111316581 A | 6/2020 |
| CN | 111328143 A | 6/2020 |
| CN | 115066933 A | 9/2022 |
| EP | 3668264 | 6/2020 |
| IN | 201814030843 A | 8/2019 |
| WO | 2019099880 A1 | 5/2019 |
| WO | 2019128751 A1 | 7/2019 |
| WO | 2020019187 A1 | 1/2020 |
| WO | 2020034440 A1 | 2/2020 |
| WO | 2021098052 A1 | 5/2021 |

OTHER PUBLICATIONS

CATT, "NR-UE-pow-sav-WUS-01", 3GPP TSG RAN WG1 Meeting #100bis-e, R1-2003067 (Year: 2020).*

Vivo, "DCI-based mechanism in skipping PDCCH monitoring or switching PDCCH monitoring periodicity", 3GPP TSG-RAN WG2 Meeting #105bis, R2-1903200 (Year: 2019).*

Ericsson, "C-DRX timers", 3GPP TSG-RAN WG2 #99bis, Tdoc R2-1711167 (Year: 2017).*

CMCC, "Discussion on PDCCH-based power saving signal/channel design", 3GPP TSG RAN WG1 #97, R1-1906524 (Year: 2019).*

Panasonic, "DL signals and channels for NR-U," 3GPP TSG RAN WG1 #96bis, Xi'an, China, R1-1904166, 5 pages, Apr. 8-12, 2019.

Oppo, "UE adaptation to the traffic for UE power saving," 3GPP TSG RAN WG1 #94bis, Chengdu, China, R1-1810976, 8 pages, Oct. 8-12, 2018.

Ericsson, "On DL signals and channels for NR-U," 3GPP TSG RAN WG1 #94, Goteborg, Sweden, R1-1809202, 6 pages, Aug. 20-24, 2018.

International Search Report and Written Opinion for International Application No. PCT/CN2020/099167, mailed on Mar. 31, 2021 (7 pages).

CNIPA, Office Action for Chinese Application No. 202080095169. 3, mailed on Mar. 18, 2024, 47 pages with unofficial English translation.

ZTE et al., "Remaining issues on the DL channels for NR-U," e-Meeting, R1-2003448, May 25-Jun. 5, 2020, 7 pages.

Lenovo "Summary #2 of email discussion [101-e-NR-unlic-NRU-DL_Signals_and_Channels-01] on Search Space" 3GPP TSG RAN WG1#101-e, e-Meeting, May 25-Jun. 5, 2020, R1-2005011, 28 pages.

ZTE "Views on power saving enhancement" 3GPP TSG RAN WG 1 #101, e-Meeting, May 25-Jun. 5, 2020, R1-2003489, 11 pages.

Huawei, HiSilicon, "Remaining issues on PDCCH based power saving" 3GPP TSG RAN WG1 Meeting #101-e E-meeting, May 25-Jun. 5, 2020, R1-2003518, 9 pages.

Extended European Search Report for co-pending EP Application No. 20943215.2, mailed on Dec. 21, 2022 (17 pages).

Official Action for co-pending JP Application No. 2022-542947, mailed on Apr. 12, 2023 (4 pages with unofficial machine translation).

JPO, Notice of Allowance for Japanese Application No. 2022-542947, mailed on Aug. 4, 2023, 3 pages.

Official Action for co-pending KR Application No. 10-2022-7024615, mailed on Nov. 25, 2024 (10 pages with unofficial machine translation).

Huawei, et al. "Remaining issues on PDCCH based power saving" 3GPP TSG RAN WG1 Meeting #101-e R1-2003518, E-meeting, May 25-Jun. 5, 2020, 9 pages.

Samsung "Remaining issues for PDCCH-based power saving signal" 3GPP TSG RAN WG1 #101-e R1-2003884, e-Meeting, May 25-May 29, 2020, 4 pages.

CNIPA, Second Office Action for Chinese Application No. 202080095169.3, mailed on Sep. 29, 2024, 8 pages with Google translation.

CNIPA, Decision to Grant for Chinese Application No. 202080095169. 3, mailed on Dec. 8, 2024, 10 pages with Google translation.

CATT, "Report on [105bis#27] [NR/Power Saving]—PDCCH skipping", 3GPP TSG-RAN WG2 Meeting #106 R2-1905665, Reno, Nevada, USA, May 13-17, 2019 24 pages.

* cited by examiner

CONTROL CHANNEL MONITORING PROCEDURE

CROSS-REFERENCE TO RELATED APPLICATION

This application is a continuation and claims priority to International Application No. PCT/CN2020/009167, filed on Jun. 30, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to a control channel monitoring procedure.

In one exemplary aspect, a method for wireless communication is disclosed. The method includes selecting, by the terminal, a monitoring configuration based on an occurrence of an event. The method also includes resetting, by the terminal, any of a first timer and/or a second timer based on the occurrence of the event. The method also includes monitoring, by the terminal, a control channel according to the selected monitoring configuration.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

Figure 1A:
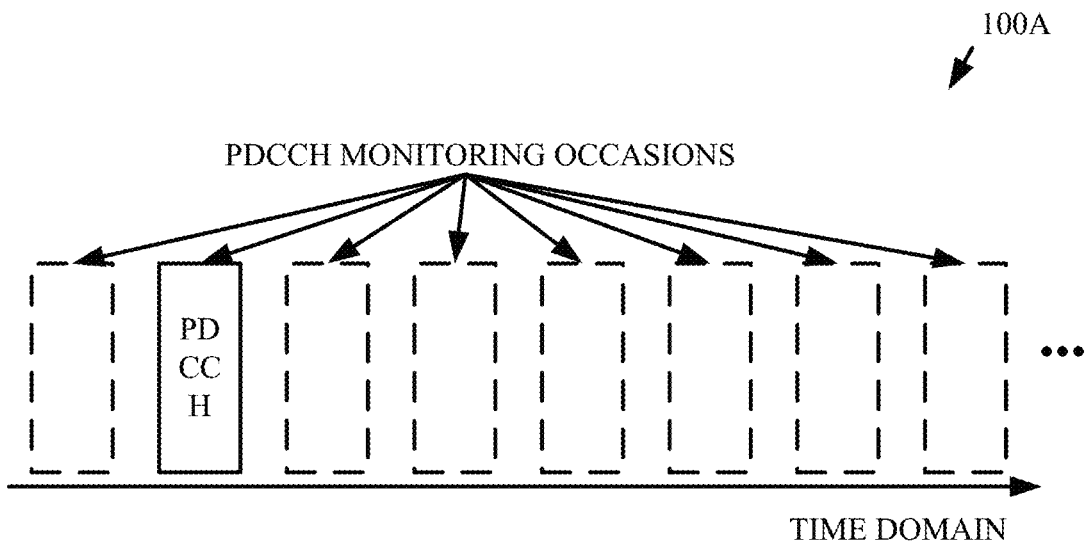
FIG. 1A is a block diagram illustrating a first example for physical downlink control channel (PDCCH) monitoring.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

In many long-term evolution (LTE) and 5G new radio access technology (NR) communication systems, the user equipment (UE) may need information to identify or locate uplink scheduling grant information for sending physical uplink shared channel (PUSCH) data and downlink scheduling allocation information for receiving physical downlink shared channel (PDSCH) data. The information may be included in the downlink control information (DCI) and sent by the base station to the UE on the PDCCH channel in different DCI formats. Accordingly, the UE may first monitor the PDCCH.

The operation of the UE to monitor the PDCCH may be performed on the control resource set and the PDCCH monitoring occasions for a search space set. The relevant monitoring parameters of the PDCCH may be included in the SearchSpace information element (IE), which can be included in a radio resource control (RRC) signaling. The searchSpaceId and the controlResourceSetId may be included in the SearchSpace IE that indicates the search space set index and the index of CORESET associated with the search space set, respectively. The searchSpaceType included in SearchSpace IE may indicate the search space type of the PDCCH that the UE needs to monitor, which can include common search space and UE-Specific search space corresponds to different DCI formats. The DCI format 0-0 and 1-0, DCI format 2-0, DCI format 2-1, DCI format 2-2, DCI format 2-3 may be included in common search space, and the DCI format 0-1 and 1-0, DCI format 0-1 and 1-1, DCI format 0-2 and/or DCI format 1-2, or DCI format 3-0 and/or 3-1 can be included in UE-Specific search space. For the UE supporting release 16, the DCI format 2-4/2-5/2-6 may also be included in the common search space and the DCI format 2-0 and 2-5 may also be included in the IAB-MT specific search space (MSS).

Each DCI format and a radio network temporary identifier (RNTI), which may be used to scramble the CRC of a DCI, may have the unique usage and the information of different function in a DCI is identified as different fields. The fields defined in the DCI formats may be mapped to the information bits $a_0$ to $a_{A-1}$. Each field may be mapped in the order in which it appears in the description, including the zero-padding bit(s), if any, with the first field mapped to the lowest order information bit $a_0$ and each successive field mapped to higher order information bits. The most significant bit of each field may be mapped to the lowest order information bit for that field, e.g. the most significant bit of the first field is mapped to $a_0$.

The duration included in the SearchSpace IE may include a duration of $T_s < k_s$ indicating the number of slots that the UE monitors PDCCH for search space set s. A monitoring-SlotPeriodicityAndOffset may be included in the SearchSpace IE indicates a PDCCH monitoring periodicity of k slots and a PDCCH monitoring offset of $o_s$ slots. A monitoringSymbolsWithinSlot included in the SearchSpace IE may indicate the first symbol(s) for PDCCH monitoring within a slot for PDCCH monitoring.

For the bit-mapping indication of the parameter monitoringSymbolsWithinSlot, the most significant (left) bit may represent the first OFDM in a slot, and the second most significant (left) bit may represent the second OFDM symbol in a slot. The bit(s) set to one can identify the first OFDM symbol(s) of the control resource set within a slot. For example, for DCI format 2_0, the first one symbol applies if the duration of CORESET (in the IE ControlResourceSet) identified by controlResourceSetId indicates 3 symbols, the first two symbols apply if the duration of CORESET identified by controlResourceSetId indicates 2 symbols, and the first three symbols apply if the duration of CORESET identified by controlResourceSetId indicates 1 symbol.

If the monitoringSymbolsWithinSlot indicates to a UE to monitor PDCCH in a subset of up to three consecutive symbols that are same in every slot where the UE monitors PDCCH for all search space sets, the UE may not expect to be configured with a PDCCH subcarrier spacing (SCS) other than 15 kHz if the subset includes at least one symbol after the third symbol. The UE may not expect to be provided a first symbol and a number of consecutive symbols for a control resource set (CORESET) that results to a PDCCH candidate mapping to symbols of different slots. The UE may not expect any two PDCCH monitoring occasions (MOs) on an active DL BWP, for a same search space set or for different search space sets, in a same CORESET to be separated by a non-zero number of symbols that is smaller than the CORESET duration.

The specific PDCCH monitoring occasion(s) can be obtained as follows. For search space set s, the UE may determine that a PDCCH monitoring occasion(s) exists in a slot with number $n_{s,f}^\mu$ in a frame with number $n_f$ if $(n_f N_{slot}^{frame,\mu} + n_{s,f}^\mu - o_s) \bmod k_s = 0$. The UE may monitor PDCCH for search space set s for $T_s$ consecutive slots, starting from slot $n_{s,f}^\mu$, and may not monitor PDCCH for search space set s for the next $k_s - T_s$ consecutive slots.

When a DRX cycle is configured, the Active Time can include various times. For example, the active time may include a time while drx-onDurationTimer or drx-InactivityTimer or drx-RetransmissionTimerDL or drx-RetransmissionTimerUL or ra-ContentionResolutionTimer is running. As another example, the active time may include a time while a Scheduling Request is sent on PUCCH and is pending. As another example, the active time may include a time while a PDCCH indicating a new transmission addressed to the C-RNTI of the medium access control (MAC) entity has not been received after successful reception of a Random-Access Response for the Random-Access Preamble not selected by the MAC entity among the contention-based Random Access Preamble.

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, etc. When using DRX operation, the MAC entity may also monitor PDCCH according to requirements. When in RRC_CONNECTED, if DRX is configured, for all the activated Serving Cells, the MAC entity may monitor the PDCCH discontinuously using the DRX operation. Alternatively, the MAC entity may monitor the PDCCH.

In many cases, a power saving techniques for 5G NR may include a wake-up indication indicated by DCI format 2-6 can indicate a UE to or not to wake up in the next long DRX cycle. Then, the physical layer of the UE can send the value to MAC layer (higher layer) to determine whether starting or not starting the drx-onDuration timer in the next long DRX cycle.

A minimum applicable scheduling offset indication indicated by DCI format 0-1/1-1 can indicate a minimum time gap between a PDCCH and a PDSCH or PUSCH scheduled by the PDCCH. For example, the slot offset of PDSCH (K0) may be defined as the time gap between the PDCCH and its scheduling PDSCH. The slot offset of PUSCH (K2) may include the time gap between the PDCCH and its scheduling PUSCH. This can make the UE relax the PDCCH decoding process time to reduce some decoding power consumption.

An indication of dormancy-like behavior transition on Scell(s) indicated by DCI format 2-6/0-1/1-1 can trigger UE to perform dormancy behavior on some Scells. If the UE is indicated by a '0' value for the activated SCell in the corresponding group of configured SCells, the UE can switch from the non-dormant BWP to the dormant BWP for the SCell. Otherwise, if the UE is indicated by a '1' value and a current active DL BWP is the dormant DL BWP, the UE can switch from the dormant BWP to the non-dormant BWP for the SCell. The dormant BWP and the non-dormant BWP may be configured by a high layer parameter.

The search space set switching indication indicated by DCI format 2-0 can indicate a group from two groups of search space sets for PDCCH monitoring for scheduling on the serving cell. The UE can monitor PDCCH according to the search space sets with the indicated group index.

Figure 1B:
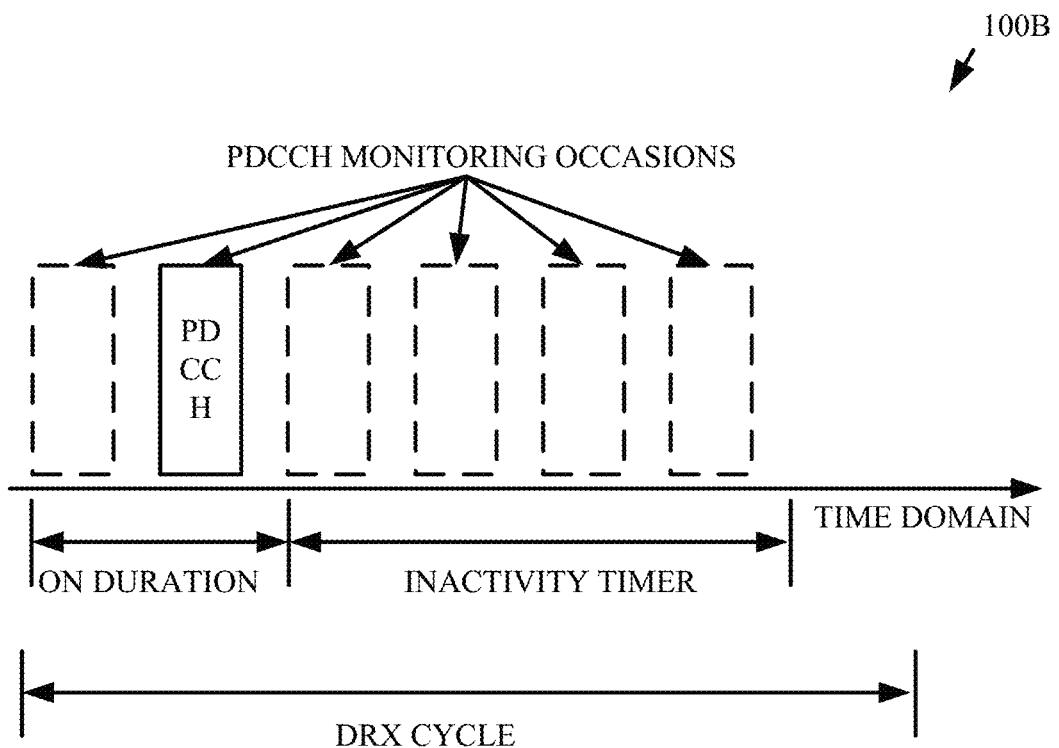
FIG. 1B is a block diagram of an example for PDCCH monitoring with a DRX configuration.

In many long-term evolution (LTE) and 5G new radio access technology (NR) communication systems, the user equipment (UE) can determine the resource for a data transmission based on the scheduling information in physical downlink control channel (PDCCH). The UE may need to keep monitoring PDCCH in PDCCH monitoring occasions to avoid missing any data scheduling information. FIG. 1A is a block diagram 100a illustrating a first example for PDCCH monitoring. The PDCCH monitoring occasion(s) may be determined by parameters of periodicity ks, a duration Ts in a periodicity and an offset Os associated with the start position of a periodicity (e.g., the PDCCH monitoring behavior with $T_s=1$ slot and $k_s=2$ slots as shown in FIG. 1A). FIG. 1B is a block diagram 100b of an example for PDCCH monitoring with a DRX configuration. The discontinuous reception (DRX) mechanism may be introduced that can ensure a UE to avoid some PDCCH monitoring power consumption during the DRX-off period (e.g., the PDCCH monitoring behavior in FIG. 1B). However, even with the wake up signal used to indicate the UE to or not to monitor PDCCH in next DRX on duration, may be introduced to ensure a UE to avoid PDCCH monitoring in a whole DRX cycle without data scheduling, PDCCH monitoring behavior of the UE may also consume unnecessary power consumption in DRX Active Time for the sparse traffic model with DRX configuration, particularly for the longer DRX cycle configuration.

In many cases, some schemes of PDCCH monitoring behavior transition may be indicated by a physical layer (L1) signaling. These schemes can provide the UE with a dynamic PDCCH monitoring behavior transition during the Active Time to help the UE adapt to different type of data transmission and reduce unnecessary power consumption of PDCCH monitoring. However, the PDCCH monitoring behavior transition indicated by a L1 signaling may increase the overhead of L1 signaling. Moreover, if the L1 signaling is miss detected by the UE, it can result to ambiguity on PDCCH monitoring behavior between the gNB and the UE.

Because the high layer parameter is configured per Cell or per Cell group if Cell group is configured, the time that the UE switches the search space set group may be different for different BWP with different SCS. It may result in the ambiguity understanding on the time applying the switched search space set group for the BWP with different SCS, especially for the cases that Cell group is configured or the BWP switching is triggered. Therefore, for the cases of the timer triggering search space set group switching, the problem that when the UE starts to switch the search space set group or to monitor PDCCH according to the search space set group should be solved.

For the UE supporting NR-U, the UE may have no available time domain resource because of no occurrence time indication. For this case, it may be unnecessary to allow the DCI format 2-0 to present the slot format indicator (SFI) field to the UE. Therefore, the problem, that which conditions the presence of the SFI field can be configured in the DCI format 2-0, may be solved.

System Overview

The present embodiments relate to a control channel monitoring procedure that can use one or more timers to trigger the UE to switch PDCCH monitoring behaviors and reduce PDCCH monitoring power consumption. The timer-based PDCCH monitoring behavior transitioning schemes may not increase the L1 signaling overhead and can help the UE change the PDCCH monitoring behavior automatically.

A wireless communication method performed by a wireless device can include selecting a monitoring behavior for a control channel based on detection of an event. The monitoring behavior can be selected from a plurality of monitoring behaviors for one or more control channels. The method can also include monitoring the control channel according to the monitoring behavior.

The event can include an expiration of a timer, and a monitoring behavior can include a search space set group configured by a higher layer parameter. The timer can be configured to be decremented or increased after a slot for a subcarrier spacing (SCS). The SCS may be the minimum SCS among the SCSs of all configured DL and/or UL bandwidth parts (BWPs) in the configured serving cells.

If the serving cell group is configured, the SCS can be the minimum SCS among the SCSs of all configured DL and/or UL BWPs in the serving cell group.

The timer can be decremented or increased after a duration of a unit when the UE detects a PDCCH. The unit can be the unit of the timer.

The PDCCH can carry the DCI format in the Type-3 common search space and UE-specific search space.

The event can be that the DCI format 2-0 indicates the search space set group switching. For the UE supporting NR-U, the slot format indicator (SFI) can be present in the DCI format 2-0 when the available RB-set indicator is configured and the channel occurrence time (COT) duration indicator is not configured, when the available RB-set indicator is not configured and the COT duration indicator is configured, and/or when the available RB-set indicator is configured and the COT duration indicator is configured.

The event can be that the DCI format 2-0 indicates the search space set group switching. For the UE supporting 5G NR, the slot format indicator (SFI) can be present in the DCI format 2-0 when the available RB-set indicator is not configured and the channel occurrence time (COT) duration indicator is not configured, when the available RB-set indicator is not configured and the COT duration indicator is configured, and/or when the available RB-set indicator is configured and the COT duration indicator is configured.

The control channel can be a PDCCH, and the monitoring behavior can include a PDCCH monitoring behavior. The monitoring behavior can include a group of search space sets that can be used by the UE to monitor the PDCCH.

The PDCCH monitoring parameters of the monitoring behavior include any of the search space type, the PDCCH monitoring frequency, the PDCCH monitoring occasion granularity, the number of available symbols Nsymb within a slot for PDCCH monitoring, and/or the duration Ts which is not smaller than 0.

The PDCCH monitoring frequency fs can represent the value of the duration divided by the PDCCH monitoring periodicity. The PDCCH monitoring granularity gs can represent a number of monitoring occasions for the total search space sets during a PDCCH monitoring periodicity.

The plurality of monitoring behaviors can be configured by the high layer parameter for the UE. The plurality of monitoring behaviors can be divided by any of the value of PDCCH monitoring periodicity ks is larger than a threshold, the value of duration Ts is smaller than a threshold; and/or the maximum monitoring frequency fs is smaller than a threshold.

Detecting the event can include a two-level timer triggering method. This can include the UE switching PDCCH monitoring behaviors between two PDCCH monitoring behaviors among the configured PDCCH monitoring behaviors. The two PDCCH monitoring behaviors can include a first PDCCH monitoring behavior and a second PDCCH monitoring behavior.

The event can include detection that the value of a first timer or a second timer is decremented to a threshold value. A first timer can be configured and decremented in the unit of millisecond or slot related to a reference BWP.

A second timer can be decremented by one after a detection of the specific PDCCH. The specific PDCCH can belong to the type-3 common search space set or the UE-specific search space type.

In some instances, a minimum gap between two candidate values of the first timer may not be smaller than 1 ms. The minimum gap between two candidate value of the second timer may not be smaller than 1. The second timer may include an integer represents the number of times for the detection of the PDCCH.

The PDCCH can belongs to the type-3 search space or the UE-specific search space.

The first PDCCH monitoring behavior can switch to the second PDCCH monitoring behavior if the value of the first timer is decremented to a threshold value or increased to the value of the first timer configured by a higher layer parameter.

The second PDCCH monitoring behavior can be switched to the first PDCCH monitoring behavior if the value of the second timer is decremented to a threshold value or increased to the value of the first timer configured by a higher layer parameter.

The value of first timer may be reset to the value of the first timer configured by a higher layer parameter depending on at least one parameter. The parameters can include any of the second timer, the current PDCCH monitoring behavior, the drx-Inactivity timer expires, the drx-onDuration timer expires, and/or the detection for the DCI format which can indicate PDCCH monitoring behavior transition.

In some embodiments, the first timer can be the drx-onDuration timer when DRX is configured.

In some embodiments, the first timer can be the drx-Inactivity timer when DRX is configured.

The value of second timer may be reset to the value of the second timer configured by a higher layer parameter depending on at least one parameter. The parameter can include any of the first timer, the current PDCCH monitoring behavior, the drx-Inactivity timer expires, the drx-onDuration timer expires, and/or the detection for the DCI format which can indicate PDCCH monitoring behavior transition.

In some embodiments, the second timer is equal to 1. The unit of the second timer can be a duration that corresponds to a reference SCS. In some instances, the unit of the second timer can include a slot or a minimum K0 if the minimum K0 is configured by the higher layer parameter.

The PDCCH monitoring behavior can be switched to another PDCCH monitoring behavior with a larger ks or Os, or a smaller Ts, Nsymb, $N_{MO}$, monitoring occasion granularity gs or monitoring frequency fs if the value of the first timer is decremented to a threshold value.

The PDCCH monitoring behavior can be switched to another PDCCH monitoring behavior with a smaller ks or Os, or a larger Ts, Nsymb, $N_{MO}$, monitoring occasion granularity gs or monitoring frequency fs if the value of the second timer is decremented to a threshold value.

In some embodiments, the threshold value is equal to 0.

The first timer and the second timer can be configured per serving cell or per serving cell group if the serving cell group is configured.

In the following, the CRC for the first type of DCI format may be scrambled by any of a C-RNTI, MCS-C-RNTI, SP-CSI-RNTI, CS-RNTI(s), SL-RNTI, SL-CS-RNTI, and/or SL-L-CS-RNTI.

In the following, the CRC for the second type of DCI format may be scrambled by any of a INT-RNTI, SFI-RNTI, TPC-PUSCH-RNTI, TPC-PUCCH-RNTI, TPC-SRS-RNTI, CI-RNTI, and/or PS-RNTI.

In the following, the PDCCH monitoring periodicity ks may also be called as the PDCCH monitoring cycle. The number of the monitoring occasions (MOs) within a slot for PDCCH monitoring may be referred to as $N_{MO}$. The number of available PDCCH monitoring occasions within a slot may be determined by the configured monitoringSymbolsWithinSlot, the CORESET duration and one or more search space sets associated with the CORESET.

In the following, the PDCCH monitoring periodicity ks may also be called as the PDCCH monitoring cycle. The number of the available symbols for PDCCH monitoring within a slot for PDCCH monitoring may be referred to as Nsymb. The available symbols for PDCCH monitoring within a slot may be determined by the configured monitoringSymbolsWithinSlot, the CORESET duration and one or more search space sets associated with the CORESET.

In the following, the PDCCH monitoring frequency fs of one or more search space sets may represent the value of Ts/ks or Ts*$N_{MO}$/ks. The case that the fs of a search space set is smaller than that of another search space set represents that the PDCCH monitoring behavior according to the search space set may be sparser than that according to another search space set.

In the following, the PDCCH monitoring occasions granularity gs may represent the number of monitoring occasions for one or more search space sets and the associated CORESET during a period. The period may not be smaller than the maximum value of PDCCH monitoring periodicity and can include the monitoring occasions for different search space sets. The case that the gs of a subset of search space sets may be smaller than that of another search space sets represents that the PDCCH monitoring behavior or occasion according to the search space set is sparser than that according to another search space set.

In the following, PDCCH monitoring behavior can represent any of the following behaviors: monitoring PDCCH according to a search space set, monitoring PDCCH according to search space sets within a group, monitoring PDCCH according to a plurality of search space sets in a search space set group, and/or monitoring PDCCH according to a list of parameters related to PDCCH monitoring.

In the following, PDCCH monitoring behavior transition can represent the functionality of any of: switching PDCCH monitoring behavior between different search space sets, switching PDCCH monitoring behavior between different groups of search space sets, switching PDCCH monitoring behavior between different lists of parameters related to PDCCH monitoring, switching PDCCH monitoring behavior between different search space sets in a search space set group, and/or switching PDCCH monitoring behavior bundled with a behavior.

In the following, the high-layer parameter can represent the radio resource control (RRC) signaling. The higher-layer parameter can represent the medium access control (MAC) signaling or the RRC signaling. The L1 signaling can represent the physical signaling or the downlink control signaling, e.g. a DCI carried by PDCCH.

In the present embodiments, the PDCCH monitoring behavior transition can be triggered by timer-based method. The timer-based methods can include any of: the PDCCH monitoring behavior transition triggered by the combination of two timers, the PDCCH monitoring behavior transition triggered by the combination of two timers and L1 signaling, the PDCCH monitoring behavior transition triggered by a single timer, and/or the PDCCH monitoring behavior transition triggered by the combination of L1 signaling and a single timer. The timer can be configured by a high layer parameter. The L1 signaling can be used to trigger the PDCCH monitoring behavior transition can be a DCI format 0-1 and/or DCI format 1-1 and/or DCI format 0-2 and/or DCI format 1-2 and/or DCI format 2-0 and/or DCI format 2-6.

Example Embodiment 1

A first example embodiment may relate to a relationship between different PDCCH monitoring behaviors.

If the UE monitors PDCCH according to a PDCCH monitoring behavior, the UE can switch to another PDCCH monitoring behavior among the configured PDCCH monitoring behaviors based on at least one event. The event can be associated with an indication of a DCI and/or a timer. One search space set can be included in different search space set groups.

The relationship between two PDCCH monitoring behaviors can be provided when a first PDCCH monitoring behavior is denser than a second PDCCH monitoring behavior. In some embodiments, the search space sets corresponding to the first PDCCH monitoring behavior and the second PDCCH monitoring behavior can have different values of the PDCCH monitoring parameters (e.g., including at least one of $\{Ts, ks, Os, Nsymb, or N_{MO}\}$).

In some embodiments, one search space set for the UE can be configured to determine both the first PDCCH monitoring behavior and the second PDCCH monitoring behavior.

In some embodiments, the PDCCH monitoring periodicity ks of one or more search space sets corresponding to the first PDCCH monitoring behavior may not be larger than that corresponding to the second PDCCH monitoring behavior.

In some embodiments, the PDCCH monitoring duration Ts of one or more search space sets corresponding to the first PDCCH monitoring behavior may not be smaller than that corresponding to the second PDCCH monitoring behavior.

In some embodiments, the PDCCH monitoring granularity gs or PDCCH monitoring frequency fs of one or more search space sets corresponding to the first PDCCH monitoring behavior may not be smaller than that corresponding to the second PDCCH monitoring behavior.

In some embodiments, the value of Nsymb of one or more search space sets corresponding to the first PDCCH monitoring behavior may not be smaller than that corresponding to the second PDCCH monitoring behavior.

In some embodiments, the PDCCH monitoring offset Os of one search space set corresponding to the first PDCCH monitoring behavior may not be larger than that of one search space set corresponding to the second PDCCH monitoring behavior.

In some embodiments, the number of PDCCH candidates of one search space set corresponding to the first PDCCH monitoring behavior may not be smaller than that of one search space set corresponding to the second PDCCH monitoring behavior.

In some embodiments, the maximum number of CORESET associated with the search space sets corresponding to the first PDCCH monitoring behavior may not be smaller than that corresponding to the second PDCCH monitoring behavior.

In some embodiments, the search space set of the first PDCCH monitoring behavior can be included in the second PDCCH monitoring behavior.

In some embodiments, all of the PDCCH monitoring behaviors used for switching correspond to the type-3 common search space or the UE-specific search space.

Example Embodiment 2

The UE can be configured by two search space set subsets via a high-layer parameter. The first PDCCH monitoring behavior can represent that the UE monitors PDCCH according to the search space sets in a first subset. The second PDCCH monitoring behavior can represent that the UE monitors PDCCH according to the search space sets in a second subset. The first subset can include the search space set 1 (ks=6 slots, Os=0, Ts=2 slots), search space set 2 (ks=6 slots, Os=3 slots, Ts=3 slots). The second subset of search space set can include the search space set 1 (ks=6 slots, Os=0, Ts=2 slots) and search space set 4 (ks=7 slots, Os=4 slots, Ts=1 slots). The specific monitoring occasions are shown with respect to FIG. 2. The UE can monitor the PDCCH for search space set 1 for $Ts^{SS1}=2$ slots starting from a slot with number $n_{s,f}^\mu=0$ in a frame with number $n_f=0$ $(n_f N_{slot}^{frame,\mu}+n_{s,f}^\mu-o_{p,s}) \mod k_{p,s}=0$. The maximum PDCCH monitoring granularity of the first subset may be larger than that of the second subset. The maximum PDCCH monitoring frequency of the first search space subset may be larger than that of the second search space subset.

If the UE can switch search space sets from a denser PDCCH monitoring frequency (e.g., first search space set subset) to a sparser PDCCH monitoring frequency (e.g., second search space set subset) more power consumption on PDCCH monitoring operation can be reduced and the UE can adapt the PDCCH monitoring behavior to the traffic in time.

The search space set 1 can be included in both the first subset and the second subset. It can provide the UE with a flexible search space set configuration when the number of a type of search space set is fewer and the UE has to monitor this type of search space set.

Figure 2:
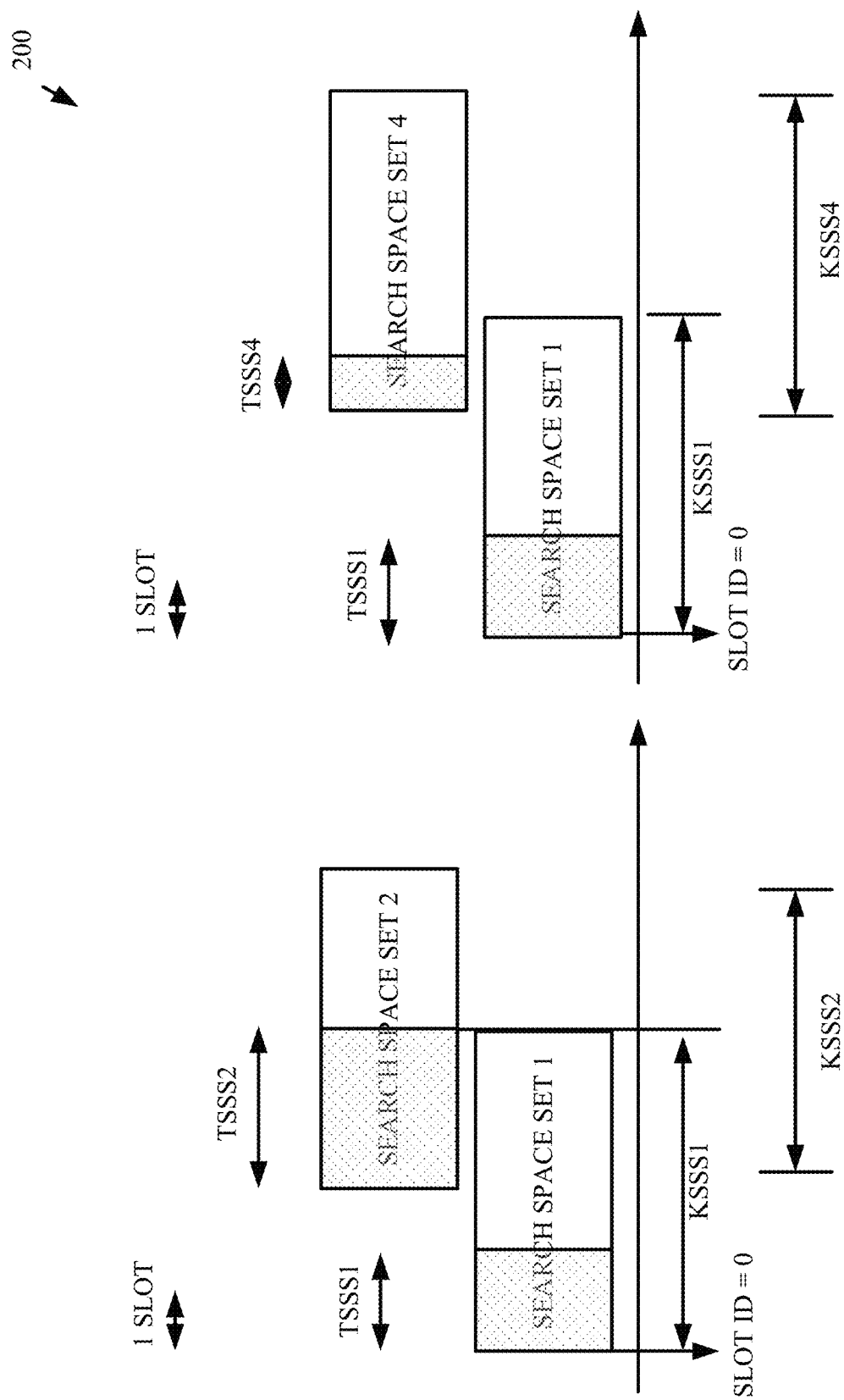
FIG. 2 is an example block diagram of two subsets of search space sets included in a same search space set.

FIG. 2 is an example block diagram 200 of two subsets of search space sets included in a same search space set. In some embodiments, the search space set of the first PDCCH monitoring behavior may not be included in the second PDCCH monitoring behavior.

Example Embodiment 3

The UE can be configured by two search space set subsets by a high-layer parameter. The first PDCCH monitoring behavior can represent that the UE monitors PDCCH according to the search space sets in a first subset. The second PDCCH monitoring behavior can represent that the UE monitors PDCCH according to the search space sets in a second subset. The first subset can include the search space set 1 (ks=6 slots, Os=0, Ts=2 slots), search space set 2 (ks=6 slots, Os=3 slots, Ts=3 slots). The second subset of search space set can include the search space set 3 (ks=6 slots, Os=0, Ts=1 slots) and search space set 4 (ks=7 slots, Os=4 slots, Ts=1 slots). The specific monitoring occasions can be shown with respect to FIG. 3. The UE can monitor PDCCH for search space set 1 for $Ts^{SS1}=2$ slots starting from a slot with number $n_f=0$ in a frame with number $n_f=0(n_f N_{slot}^{frame,\mu}+n_{s,f}^\mu-o_{p,s}) \mod k_{p,s}=0$. The maximum PDCCH monitoring granularity of the first subset may be larger than that of the second subset. The maximum PDCCH monitoring frequency of the first search space subset can be larger than that of the second search space subset.

If the UE can switch search space sets from a denser PDCCH monitoring frequency (e.g., first search space set subset) to a sparser PDCCH monitoring frequency (e.g., second search space set subset) more power consumption on PDCCH monitoring operation can be reduced and the UE can adapt the PDCCH monitoring behavior to the traffic in time.

Moreover, the search space sets between the first subset and the second subset may be different. This can provide the UE with a clear PDCCH monitoring behavior when the traffic type changes or only a fewer types of DCI format is required to be monitored by the UE. This method can be used for the case that the UE switches PDCCH monitoring behavior among the search space sets in a search space set group.

Figure 3:
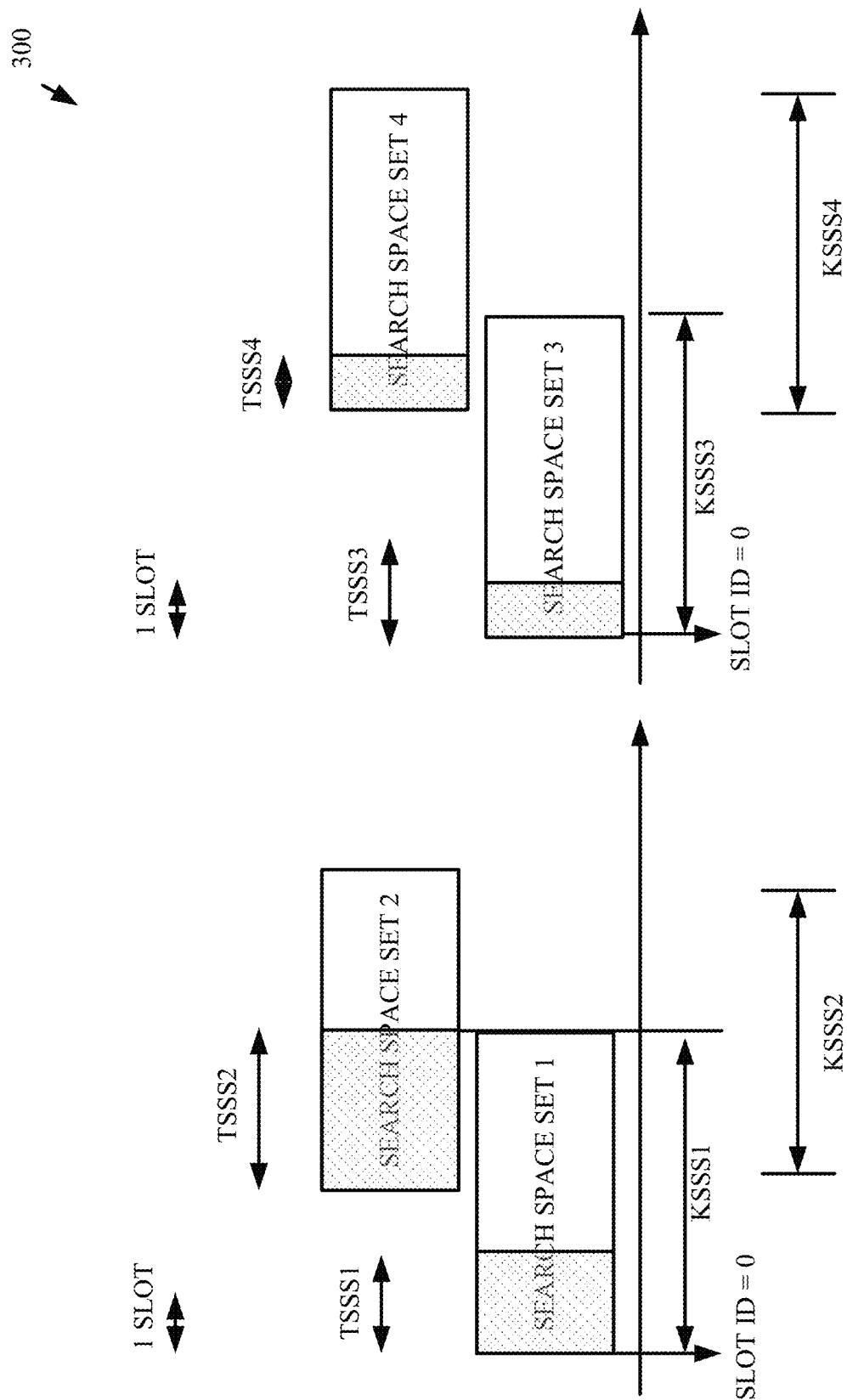
FIG. 3 is an example block diagram of two subsets of search space sets that do not include a same search space set.

FIG. 3 is an example block diagram 300 of two subsets of search space sets that do not include a same search space set.

The relationship between the multiple PDCCH monitoring behaviors can have a different maximum or minimum PDCCH monitoring frequency, PDCCH monitoring granularity, PDCCH monitoring periodicity, and/or PDCCH monitoring duration. In some embodiments, the UE can switch PDCCH monitoring behavior among multiple PDCCH monitoring behaviors. In some embodiments, the multiple PDCCH monitoring behaviors can have different values of PDCCH monitoring parameters.

In some embodiments, the multiple PDCCH monitoring behaviors can have different search space types. In some embodiments, the same search space type among multiple PDCCH monitoring behaviors can have different maximum or minimum PDCCH monitoring parameters. In some embodiments, the value of PDCCH monitoring parameters among multiple PDCCH monitoring behaviors can be smaller than different thresholds. Wherein the threshold is used to distinguish the multiple PDCCH monitoring behaviors. In some embodiments, the value of PDCCH monitoring parameters among multiple PDCCH monitoring behaviors can be smaller than different thresholds.

The PDCCH monitoring parameters can include PDCCH monitoring periodicity ks, offset Os, duration Ts, PDCCH monitoring occasion granularity gs, PDCCH monitoring frequency fs, the number of available symbols within a slot for PDCCH monitoring Nsymb, and the number of PDCCH monitoring occasions $N_{MO}$.

A first example can include L1 signaling and a timer triggering search space set group switching. For a DRX configuration, the UE can be indicated to perform search space set group switching by a DCI or a timer if the high-layer parameter configures the lists of search space set group to the UE. In some embodiments, the number of search space set group is configured by a high-layer parameter.

In some embodiments, the UE can switch search space set group between two search space set groups in the list of the search space set group when the high-layer parameter configures that the UE can be indicated or triggered to perform search space set group switching operation. The list of the search space set group may be configured by a high-layer parameter.

A first option can include a DCI format 2-0 to indicate the SS group switching for the UE with DRX configuration. The search space set group switching can be indicated by DCI format 2-0 for a group of UEs when the high-layer parameter configures the location of the search space set switching field in the DCI format 2-0 for each UE.

In some embodiments, a flag can be used to indicate whether the DCI format 2-0 detected by the UE presents or not presents the SFI field. In some embodiments, the flag can be presented in the DCI format 2-0 when the higher layer parameter configures the location of the search space set switching field in the DCI format 2-0 for the UE and may not configure the location of the SFI field or the UE ignores the field of the SFI field.

In some embodiments, the flag can be used to indicate whether the search space set switching field is only presented in the DCI format 2-0.

In some embodiments, the flag can be presented in the DCI format 2-0 when the higher layer parameter configures the location of the search space set switching field in the DCI format 2-0 for the UE.

In some embodiments, the flag can be indicated by the DCI format 2-0 if the higher layer parameter configures the location of the field of the flag.

In some embodiments, the flag can be configured by the high-layer parameter for the UE. In some embodiments, if the search space set switching flag is configured by the high-layer parameter, the UE can detect the DCI format 2-0 including the search space set switching field and no including the SFI field. In some embodiments, if the search space set switching flag is not configured by the high-layer parameter, the UE can detect the DCI format 2-0 including the search space set switching field and the SFI field.

In some embodiments, the UE determines the slot format when the UE is not configured or not indicated the flag. In some embodiments, the UE determines a set of symbols of a slot indicated to a UE as flexible or as the slot format configured by the higher layer parameter when the UE detects the DCI format 2-0 and the location of the SFI field is not configured and the search space set group switching flag is configured.

In some embodiments, the UE determines a set of symbols of a slot indicated to a UE as flexible or as the slot format configured by the higher layer parameter when the UE detects the DCI format 2-0 and the location of the SFI field is not configured or the flag is configured.

The present embodiments can reduce the overhead of the DCI format 2-0 when the UE only requires the search space set group switching indication.

A second option can include using a timer to indicate the SS group switching for the UE with DRX configuration. A timer can trigger the search space set group switching for the UE. The timer value can be configured by the high-layer parameter. If the UE monitors PDCCH according to a first search space set group, the UE can switch to the second search space set group when the timer is expired.

In some embodiments, the timer is decremented by one after a slot for a reference SCS.

In some embodiments, the timer is configured and decremented in the units of a reference SCS. In some embodiments, the reference SCS is the minimum reference SCS among all BWPs in a primary Cell or a Cell groups if the Cell group is configured. In some embodiments, the reference SCS is the minimum SCS of {15, 30, 60} kHz.

In some embodiments, the timer is configured in the units of a millisecond (ms). In some embodiments, the timer can be the drx-Inactivity timer, and the UE can switch from the first search space set group to the second search space set group when the drx-Inactivity timer is expired.

The timer can be reset to the value configured by the high-layer parameter if the UE meets any of the following conditions. In some embodiments, if the UE monitors PDCCH according to the second search space set group, the timer can be reset and the UE can switch to the first search space set group when the UE detects a PDCCH indicating the first search space set group. In some embodiments, if the UE monitors PDCCH according to the second search space set group, the timer can be reset, and the UE can switch to first search space set group when the UE detects a PDCCH scheduling a data transmission during a period.

In some embodiments, the period is the DRX onDuration. In some embodiments, the period is the Active Time. In some embodiments, the timer is configured for a serving cell or a serving cell group if the serving cell group is configured.

The timer can start to be decremented or increased by the UE when the UE met the following conditions. In some embodiments, if the UE monitors PDCCH according to the second search space set group, the timer can be started, and the UE can switch to the first search space set group when the UE detects a PDCCH indicating the first search space set group. In some embodiments, if the UE monitors PDCCH according to the second search space set group, the timer can be started, and the UE can switch to first search space set group when the UE detects a PDCCH scheduling a data transmission during a period.

A third option can include using a scheduling DCI format to indicate the SS set group switching for the UE with DRX configuration. In some embodiments, the DCI format 0-1 can be used to indicate the search space set group switching by a search space set group switching field if the high-layer parameter configures the search space set group switching.

In some embodiments, the DCI format 1-1 can be used to indicate the search space set group switching by a search space set group switching field if the high-layer parameter configures the search space set group switching. In some embodiments, the UE can report the HARQ-ACK information for the search space set group switching indication detected in the DCI format 1-1. The scheduling DCI can be the DCI format 0-2 or DCI format 1-2.

A fourth option can include using a non-scheduling DCI format to indicate the SS set group switching for the UE with DRX configuration. In some embodiments, the DCI format 2-6 can be used to indicate the search space set group for a group of UE if the location of the search space set group switching field is configured by the high-layer parameter. In some embodiments, the search space set group switching field is immediately after the bit location of the wake-up indication field or the SCell dormancy behavior field if the bitmap indication of a number of groups of configured SCells is configured by the high-layer parameter.

In some embodiments, the search space set group switching field is presented in the DCI format 2-6 when the UE monitors PDCCH according to the first search space set group.

In some embodiments, the search space set group switching field is presented in the DCI format 2-6 when the wake-up indication of the DCI format 2-6 indicates the physical layer of the UE to send the wake-up indication to the MAC layer.

In some embodiments, the search space set group switching field is presented in the DCI format 2-6 when the DCI format 2-6 indicates the UE to switch from the first search space set group to the second search space set group.

In some embodiments, the search space set group switching field is not presented in the DCI format 2-6 when the wake-up indication of the DCI format 2-6 indicates the physical layer of the UE to send the not wake-up indication to the MAC layer.

In some embodiments, the search space set group switching field is not presented in the DCI format 2-6 when the UE monitors PDCCH according to the second search space set group.

The UE can be indicated by at least one of the options listed above to switch the search space set group. This method can provide the UE with more flexible operation and freedom to adapt the PDCCH monitoring behavior. Moreover, the method can also provide the UE with PDCCH monitoring switching function within the Active Time during a DRX cycle.

The present embodiments may relate to avoiding the ambiguity of timer decrementing for search space set group switching. Because the duration of one slot is related to the SCS of a BWP, the timer value can be decremented in the units of the SCS.

In some embodiments, the timer value is decremented after a slot for a reference SCS. In some embodiments, the timer value is configured and decremented in units of a reference SCS. In some embodiments, the reference SCS is the minimum SCS among the configured BWPs in the Cells. In some embodiments, if Cell group is configured, the reference SCS is the minimum SCS among the configured BWPs in the Cell group.

In some embodiments, the configured BWPs represents the DL BWPs configured for the UE.

In some embodiments, the reference SCS is the minimum SCS among all active BWPs in the Cells or the Cell group if Cell group is configured. In some embodiments, the reference SCS is the minimum SCS of {15, 30, 60, 120} kHz. In some embodiments, the timer can be decremented after an application delay when the UE detects a DCI format in the Type-3 common search space or UE-specific search space. In some embodiments, the timer can be decremented after a duration of a unit when the UE detects a PDCCH. Wherein the unit is the unit of the timer. In some embodiments, the PDCCH can carry the DCI format in the Type-3 common search space or UE-specific search space. In some embodiments, an application delay can be a number of symbols.

By using one of these methods, the UE can configure or decrement the timer in the units of a number of slot because the duration of one slot for the minimum SCS is an integer multiple of that for the other larger SCS. In some embodiments, the reference SCS is the maximum SCS among the configured BWPs in the Cells or the Cell group if Cell group is configured. In some embodiments, the reference SCS is the maximum SCS of {15, 30, 60, 120} kHz.

In some embodiments, the configured BWPs represents the DL BWPs configured for the UE.

By using one of these methods, the UE can configure or decrement the timer in the units that are not larger than a slot because the duration of one slot for the maximum SCS is smaller than that for the other smaller SCS. In some embodiments, the SFI field in the DCI format 2-0 is present when the available RB-set indicator is configured, and the COT duration indicator is configured.

For the UE supporting NR-U, this method can ensure the UE can communicate with the other device without interruption. In some embodiments, the SFI field in the DCI format 2-0 is present when the available RB-set indicator is configured, and the COT duration indicator is not configured. For the UE supporting NR-U, this method can help the UE evaluate the radio link quality/state in advance. In some embodiments, the SFI field in the DCI format 2-0 is present when the available RB-set indicator is not configured, and the COT duration indicator is configured.

For the UE supporting NR-U, this method can help the UE relax the PDCCH processing time for the DCI format does not indicate the available RB. In some embodiments, the SFI field in the DCI format 2-0 is present when the available RB-set indicator is not configured, and the COT duration indicator is not configured. For the UE supporting or not supporting NR-U, this method can keep the UE sync its slot format for the channel which the UE expects to occupy.

In some embodiments, the SFI field in the DCI format 2-0 is present when at least one condition is met. Example conditions can include the available RB-set indicator is not configured and the COT duration indicator is not configured, the available RB-set indicator is configured and the COT duration indicator is not configured, the available RB-set indicator is not configured and the COT duration indicator is configured, and/or the available RB-set indicator is configured and the COT duration indicator is configured.

Example Embodiment 4

A fourth example embodiment can relate to a quantity related to two-level timer parameters that include the values, units, and configuration relating to the two-level timer.

In some embodiments, the UE starts decrementing/increasing the first timer or the second timer after a number of symbols when the UE detects a DCI indicating the PDCCH monitoring behavior transition. In some embodiments, the UE starts decrementing/increasing the first timer or the second timer when the UE starts running the drx-onDuration timer. In some embodiments, the UE starts decrementing/increasing the first timer or the second timer when the UE starts running the drx-Inactivity timer.

In some embodiments, the unit of the first timer is millisecond which represents a consecutive time. In some embodiments, the unit of the second timer is an integer which represents the number of a specific PDCCH detected by the UE during the first timer duration. In some embodiments, the first timer is decremented after a slot for a reference SCS. In some embodiments, the first timer is decremented after a span. In some embodiments, the first timer is decremented after a slot. In some embodiments, the first timer is decremented after a monitoring occasions.

In some embodiments, the first timer is decremented in the units of three symbols. In some embodiments, the second timer is decremented in the units of the times of detection for a specific PDCCH. Wherein the specific PDCCH is the PDCCH in type-3 search space or UE-specific search space. In some embodiments, the minimum gap between the two adjacent first timer values is not smaller than 0.125 millisecond (ms). In some embodiments, the minimum gap between the two adjacent second timer values is not smaller than 1. In some embodiments, the first timer and the second timer are configured per UE. In some embodiments, the first timer and the second timer are configured per serving cell group. In some embodiments, the second timer is predefined as 1.

For example, the timer is the first timer which is decremented and configured in the units of a reference SCS. In this example, the second timer is equal to 1 which is decremented by the one if the UE detects a PDCCH. In the present embodiments, "a timer expired" can represents that a timer is increased to the value configured by the high-layer parameter or decremented to 0.

In some embodiments, the first timer is expired when the first timer is decremented to 0. In some embodiments, the first timer is expired when DRX is configured and the slot is outside the Active Time. In some embodiments, the first timer is expired when the UE receives a DCI indicating BWP switching behavior. In some embodiments, the first timer is expired when the UE switches BWP triggered by a timer. The timer can include a bwp-InactivityTimer.

In some embodiments, the second timer is expired when the first timer is decremented to 0. In some embodiments, the second timer is expired when DRX is configured and the slot is outside the Active Time. In some embodiments, the second timer is expired when the UE receives a DCI indicating BWP switching behavior. In some embodiments, the second timer is expired when the UE switches BWP triggered by a timer. Wherein the timer is a bwp-InactivityTimer.

In some embodiments, the first timer is reset when the second timer is decremented to 0. In some embodiments, the first timer is reset when the second timer is expired. In some embodiments, the first timer is reset when the UE can switch the PDCCH monitoring behavior triggered by DCI or time-based event. In some embodiments, the second timer is reset when the first timer is decremented to 0. In some embodiments, the second timer is reset when the first timer is expired. In some embodiments, the second timer is reset when the UE can switch the PDCCH monitoring behavior triggered by DCI or time-based event.

In a first option, a first or second timer configuration can be configured in various configurations. In some embodiments, the first timer is configured per serving cell. In some embodiments, the second timer is configured per serving cell. This can provide the UE with more accurate PDCCH monitoring adaptation triggered by timer for each serving cell. In some embodiments, the UE monitors PDCCH according to the switched PDCCH monitoring behavior after the slot of the first timer or the second timer decremented to 0.

In some embodiments, the first timer is configured per serving cell group. In some embodiments, the second timer is configured per serving cell group. This can provide the UE with the same PDCCH monitoring behavior across all serving cells configured by the high-layer parameter. In some embodiments, the PDCCH monitoring behavior transition triggered by one or more timer(s) can be used for the PDCCH monitoring in the primary serving cell and the scheduled secondary serving cell for the UE.

In some embodiments, if the UE is configured a primary serving cell and a group of secondary serving cells, the UE can monitor PDCCH according to the switched PDCCH monitoring behavior at the first slot of the next subframe or frame in the active BWP of the PCell and all scheduled SCells. This method may ensure that the UE can monitor PDCCH according to the same PDCCH monitoring behavior at the same time across all the BWPs on each serving cell.

In some embodiments, the first timer is configured per BWP. In some embodiments, the second timer is configured per BWP. In some embodiments, if the BWP is switched, the first timer can be reset as the value configured for the switched BWP. In some embodiments, if the BWP is switched, the second timer can be reset as the value configured for the switched BWP.

In some embodiments, the first timer is configured by higher layer parameter. In some embodiments, the second timer is defined as a specific value. Wherein the specific value is an integer and is larger than 0.

Example Embodiment 5

Example Embodiment 5 can relate to timer-based event triggering the PDCCH monitoring behavior transition. A first timer and a second timer can be used to trigger the UE to switch PDCCH monitoring behavior. The first timer can be decremented or increased based on a first event and the second timer can be decremented or increased based on a second event.

The UE can switch the PDCCH monitoring behavior to the other PDCCH monitoring behavior when the first timer or the second timer is decremented or increased to a threshold. The threshold for the first timer and the second timer is different. The threshold may not be smaller than 0 and the unit of the threshold is the same as that of the corresponding timer.

In some embodiments, the first timer and the second timer can be decremented or increased based on different events. In some embodiments, the first timer value is larger than the second timer value relative to one slot.

In the following embodiments, the words "decremented" or "decrementing" may represent the meaning of the word "decremented or increased" or "decrementing or increasing."

A first method can include PDCCH monitoring behavior transitions between two PDCCH monitoring behaviors. In some embodiments, the PDCCH monitoring behavior transitions from the first PDCCH monitoring behavior to the second PDCCH monitoring behavior when the first timer is decremented to 0 or increasing to the value which is configured by the higher layer parameter. In some embodiments, the PDCCH monitoring behavior transitions from the second PDCCH monitoring behavior to the first PDCCH monitoring behavior when the second timer is decremented to 0 or increased to the value which is configured by the higher layer parameter.

The first timer can expire when the first timer is decremented to 0 or increased to the value which is configured by the higher layer parameter. The second timer can expire when the second timer is decremented to 0 or increased to the value which is configured by the higher layer parameter.

Figure 4A:
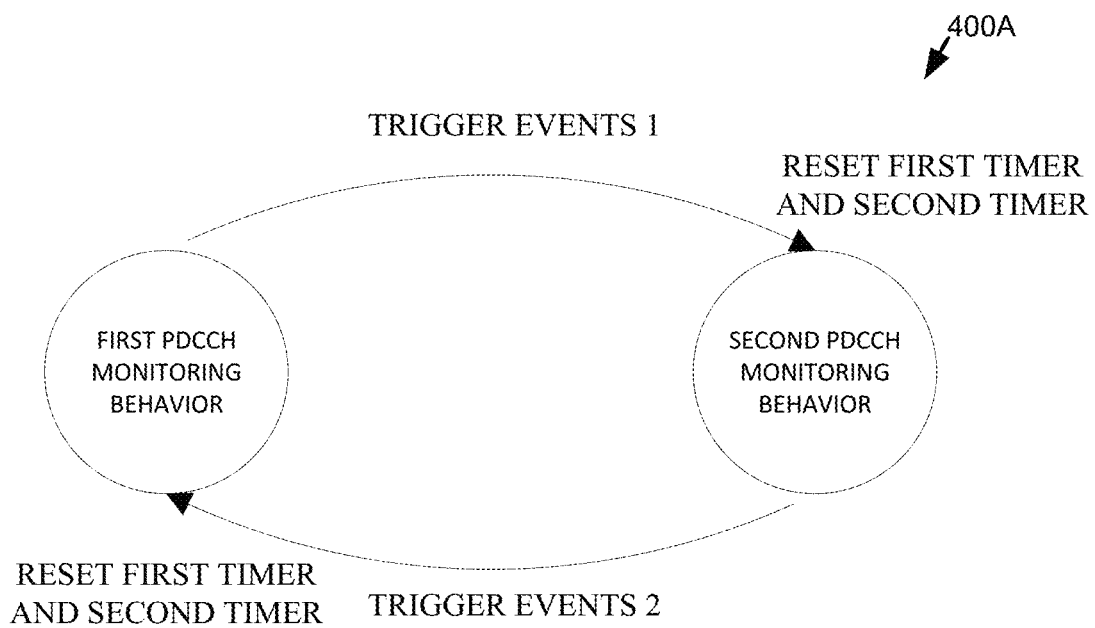
FIG. 4A is an example block diagram of a first method of two-level timer based PDCCH monitoring behavior transition.
Figure 4B:
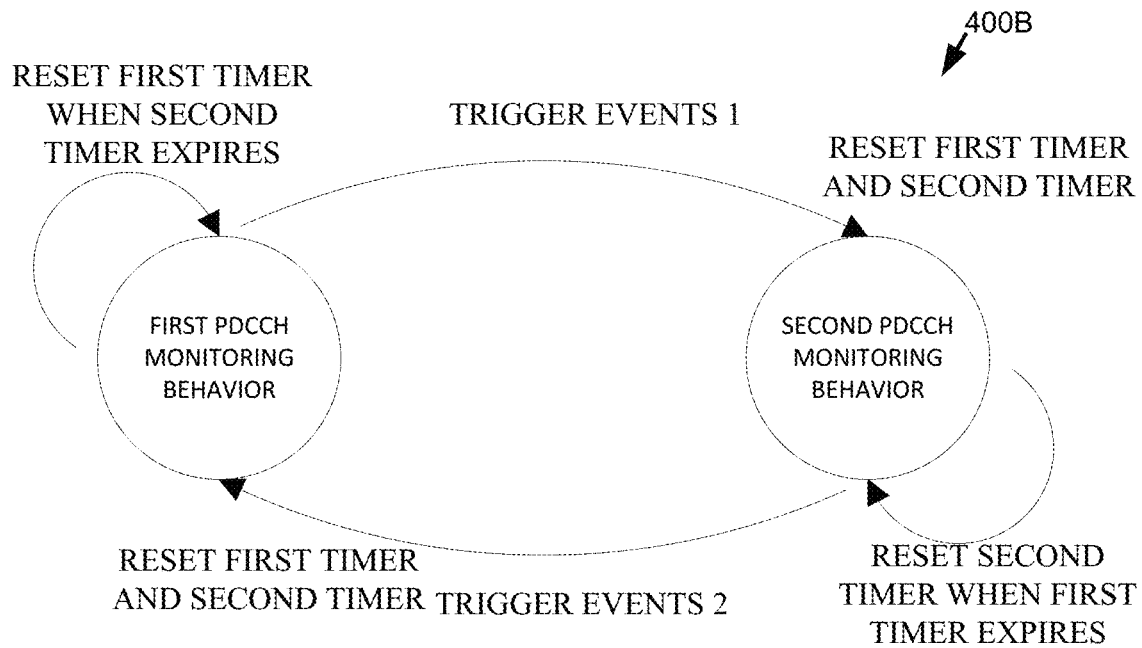
FIG. 4B is an example block diagram of a second method of two-level timer based PDCCH monitoring behavior transition.

The first method on PDCCH monitoring behavior transition is shown with respect to FIGS. 4A and 4B. Both the first timer and the second timer may reset when the PDCCH monitoring behavior transition. The UE may stop decrementing/increasing the second timer when the UE monitors PDCCH according to the first PDCCH monitoring behavior. The UE may stop decrementing/increasing the first timer when the UE monitors PDCCH according to the second PDCCH monitoring behavior. For example, the PDCCH monitoring state without self-circulation is shown in FIG. 4A.

FIG. 4A is an example block diagram 400a of a first two-level timer based PDCCH monitoring behavior transition. The first timer may reset when the second timer is expired, and the second timer may reset when the second timer is expired. The UE may keep decrementing/increasing the second timer when the UE monitors PDCCH according to the first PDCCH monitoring behavior. The UE may keep decrementing/increasing the first timer when the UE monitors PDCCH according to the second PDCCH monitoring behavior. For example, the PDCCH monitoring state with self-circulation as shown in FIG. 4B.

FIG. 4B is an example block diagram 400b of a second two-level timer based PDCCH monitoring behavior transition. This method can help the UE adapt the PDCCH monitoring behavior more flexibly by two-level timer for each PDCCH monitoring behavior state. The method as illustrated in FIG. 4B can decouple the two timers. The method in FIG. 4B can also avoid transitioning the PDCCH monitoring behavior frequently if the scheduling data transmission is kept in a same state, e.g. the traffic is denser when the UE performs the first PDCCH monitoring behavior.

Figure 5A:
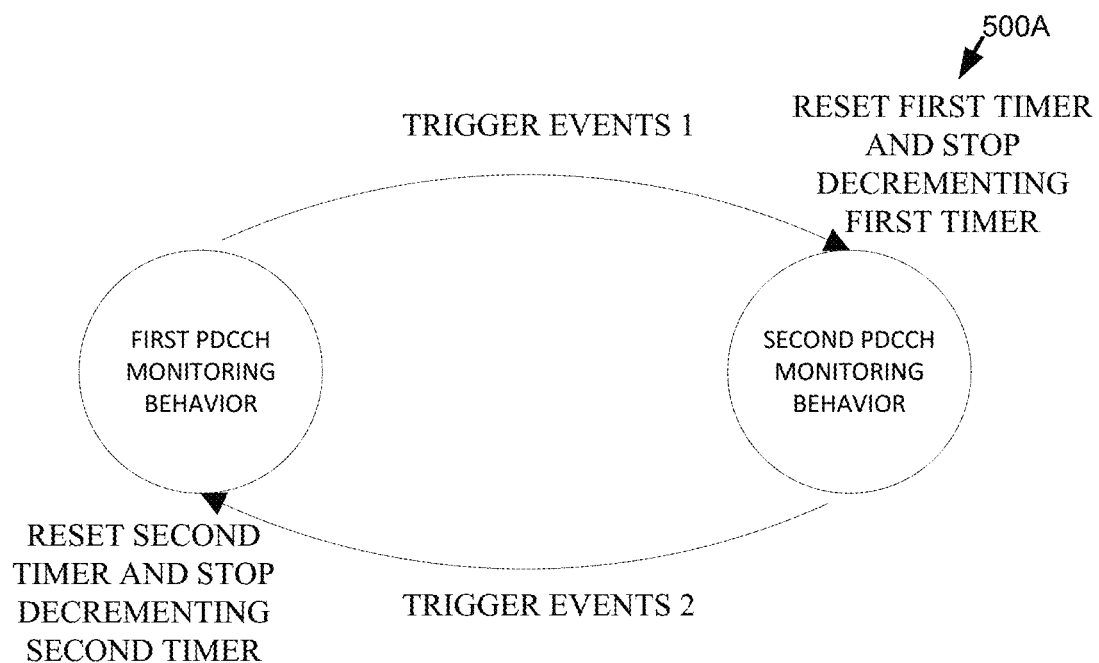
FIG. 5A is an example block diagram of a first method of two-level timer based PDCCH monitoring behavior transition with reduced timer operation.
Figure 5B:
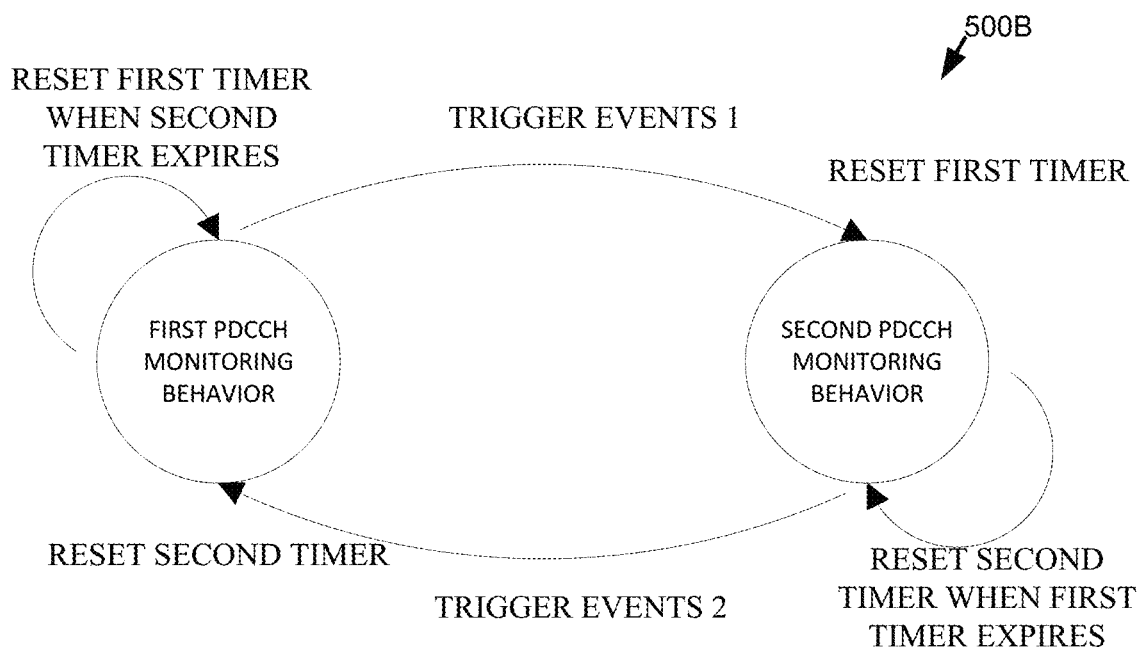
FIG. 5B is an example block diagram of a second method of two-level timer based PDCCH monitoring behavior transition with reduced timer operation.

A second method on PDCCH monitoring behavior transition is shown with respect to FIGS. 5A and 5B. Only the second timer may be reset when the PDCCH monitoring behavior is switched from the second PDCCH monitoring behavior to the first PDCCH monitoring behavior. Only the first timer may be reset when the PDCCH monitoring behavior is switched from the first PDCCH monitoring behavior to the second monitoring behavior.

In some embodiments, if the UE monitors PDCCH according to the first PDCCH monitoring behavior, the second timer may not be decremented/increased. In some embodiments, if the UE monitors PDCCH according to the second PDCCH monitoring behavior, the first timer is not decremented/increased.

If UE monitors PDCCH according to the first monitoring behavior, the UE may stop running the first timer, and the UE can switch PDCCH monitoring behavior to the second PDCCH monitoring behavior if the second timer is expired. If UE monitors PDCCH according to the first monitoring behavior, the UE can stop running the second timer, and the UE can switch PDCCH monitoring behavior to the first PDCCH monitoring behavior if the first timer is expired. The UE can reset the first timer if the UE switches PDCCH monitoring behavior to the second PDCCH monitoring behavior. The UE can reset the second timer if the UE switches PDCCH monitoring to the first PDCCH monitoring behavior.

FIG. 5A is an example block diagram 500a of a first two-level timer based PDCCH monitoring behavior transition with reduced timer operation. For example, in FIG. 5A, only one of the two timers may need to be reset when the PDCCH monitoring behavior transition is triggered. The second timer may not be required to be decremented when the UE monitors PDCCH according to the first PDCCH monitoring behavior. The first timer may not be required to be decremented when the UE monitors PDCCH according to the second PDCCH monitoring behavior. It may not only reduce the timer resetting operations reduce the timer decrementing operations but also decouple the first timer and the second timer.

In some embodiments, if the UE monitors PDCCH according to the first PDCCH monitoring behavior and the second timer is expired, the first timer can be reset. In some embodiments, if the UE monitors PDCCH according to the second PDCCH monitoring behavior and the first timer is expired, the second timer can be reset.

If UE monitors PDCCH according to the first monitoring behavior, the UE can keep running the first timer, and the UE can switch PDCCH monitoring behavior to the second PDCCH monitoring behavior if the second timer is expired. If UE monitors PDCCH according to the first monitoring behavior, the UE can keep running the second timer, and the UE can switch PDCCH monitoring behavior to the first PDCCH monitoring behavior if the first timer is expired. The UE can reset the first timer if the UE switches from the first PDCCH monitoring behavior to the second PDCCH monitoring behavior. The UE can reset the second timer if the UE switches from the second PDCCH monitoring to the first PDCCH monitoring behavior.

FIG. 5B is an example block diagram 500b of a second two-level timer based PDCCH monitoring behavior transition with reduced timer operation. For example, in FIG. 5B, the self-circulation of the two timers is used for the PDCCH monitoring behavior transition and only one of the two timers may need to be reset when the PDCCH monitoring behavior transition is triggered. If the UE monitors PDCCH according to the first PDCCH monitoring behavior, the first timer may be reset when the second timer is decremented to 0. If the UE monitors PDCCH according to the second PDCCH monitoring behavior, the second timer may be reset when the first timer is decremented to 0. It can not only reduce the timer resetting operations but also avoid keeping the UE stay in a same PDCCH monitoring behavior for a long time. This method can ensure the UE to avoid monitoring PDCCH according to a PDCCH monitoring behavior for a long time and can reduce more power consumption when the traffic is a little denser.

Figure 6A:
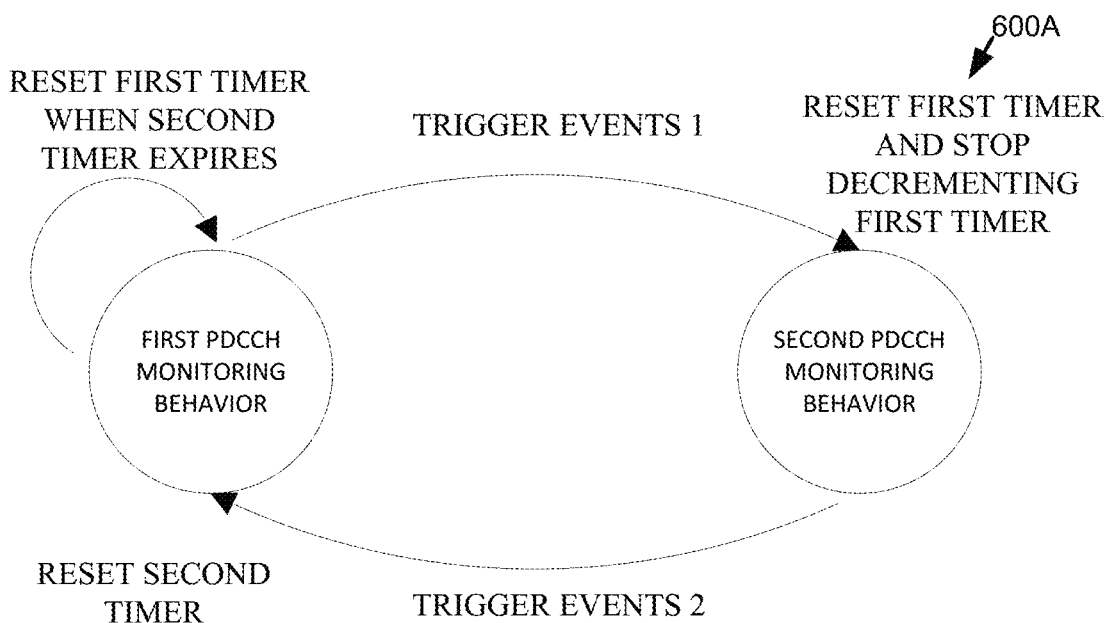
FIG. 6A is an example block diagram for a first method of two-level timer based PDCCH monitoring behavior transition with reduced timer operation.
Figure 6B:
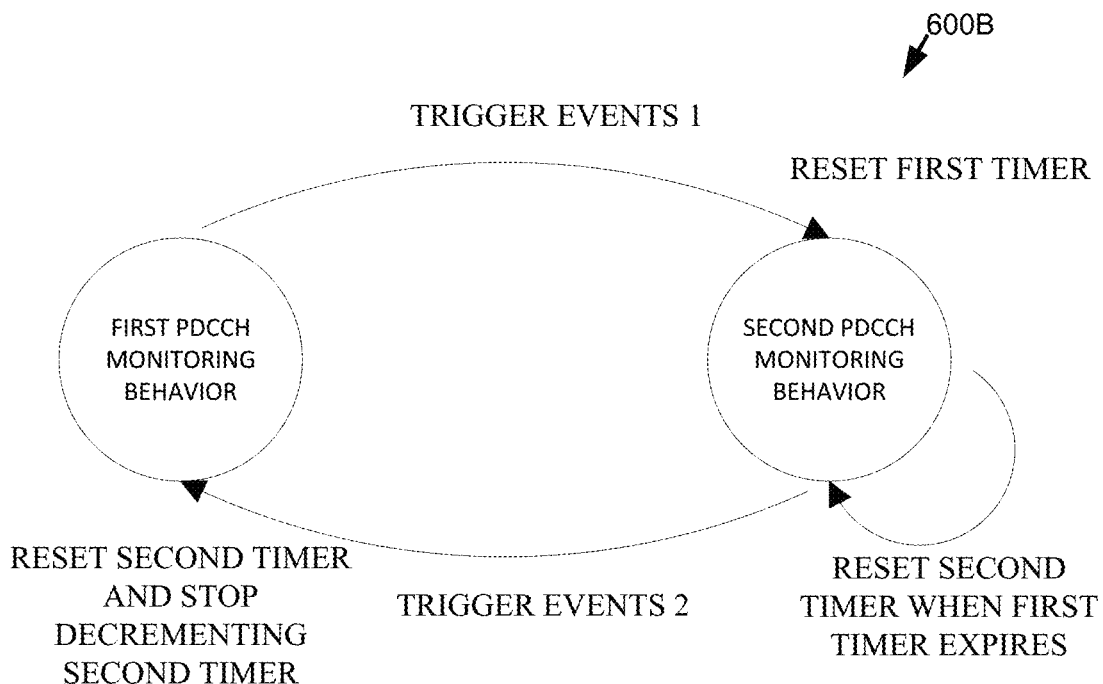
FIG. 6B is an example block diagram for a second method of two-level timer based PDCCH monitoring behavior transition with reduced timer operation.

Other methods may be based on the second method on PDCCH monitoring behavior transition is shown in FIGS. 6A and 6B. Only the second timer may be reset when the PDCCH monitoring behavior is switched from the second PDCCH monitoring behavior to the first PDCCH monitoring behavior. The first timer may be reset when the PDCCH monitoring behavior is switched from the first PDCCH monitoring behavior to the second monitoring behavior.

FIG. 6A is an example block diagram 600a for a first two-level timer based PDCCH monitoring behavior transition with reduced timer operation. In some embodiments, if the UE monitors PDCCH according to the first PDCCH monitoring behavior, the first timer should be reset when the second timer is expired. If the UE monitors PDCCH according to the second PDCCH monitoring behavior, the first timer may not be decremented as shown in FIG. 6A. It may keep the UE monitor PDCCH according to the first PDCCH monitoring behavior for a longer time and then avoid increasing the latency.

FIG. 6B is an example block diagram 600b for a second two-level timer based PDCCH monitoring behavior transition with reduced timer operation. In some embodiments, if the UE monitors PDCCH according to the second PDCCH monitoring behavior, the second timer should be reset when the first timer is expired. If the UE monitors PDCCH according to the first PDCCH monitoring behavior, the second timer is not decremented as shown in FIG. 6B. It can keep the UE monitor PDCCH according to the second PDCCH monitoring behavior for a longer time and then reduce more power consumption.

Example Embodiment 6

In some instances, the UE may be configured with DRX. The first timer may be configured as 9 ms, and the second timer is configured as 3 ms. The first timer value can be decremented by one after 1 ms, and the second timer can be decremented by one after the slot that the UE detects a PDCCH within the type-3 common search space set or the UE-specific search space set during the Active Time.

The first PDCCH monitoring behavior can represent the 1 slot monitoring duration during 2 slots monitoring periodicity and the second PDCCH monitoring behavior represents the 1 slot monitoring duration during 4 slots monitoring periodicity. The PDCCH monitoring behavior transitioning procedure for the UE may be illustrated with respect to FIG. 7.

First, the UE can monitor PDCCH according to the second PDCCH monitoring behavior. The UE can switch the PDCCH monitoring behavior from the second PDCCH monitoring behavior to the first PDCCH monitoring behavior after the slot that the second timer is decremented to 0. When the UE begins to monitor PDCCH according to the first PDCCH monitoring behavior, the second timer and the first timer may be reset.

Then, the UE can switch the PDCCH monitoring behavior from the first PDCCH monitoring behavior to the second PDCCH monitoring behavior and the second timer is reset after the slot that the first timer is decremented to 0.

Figure 7:
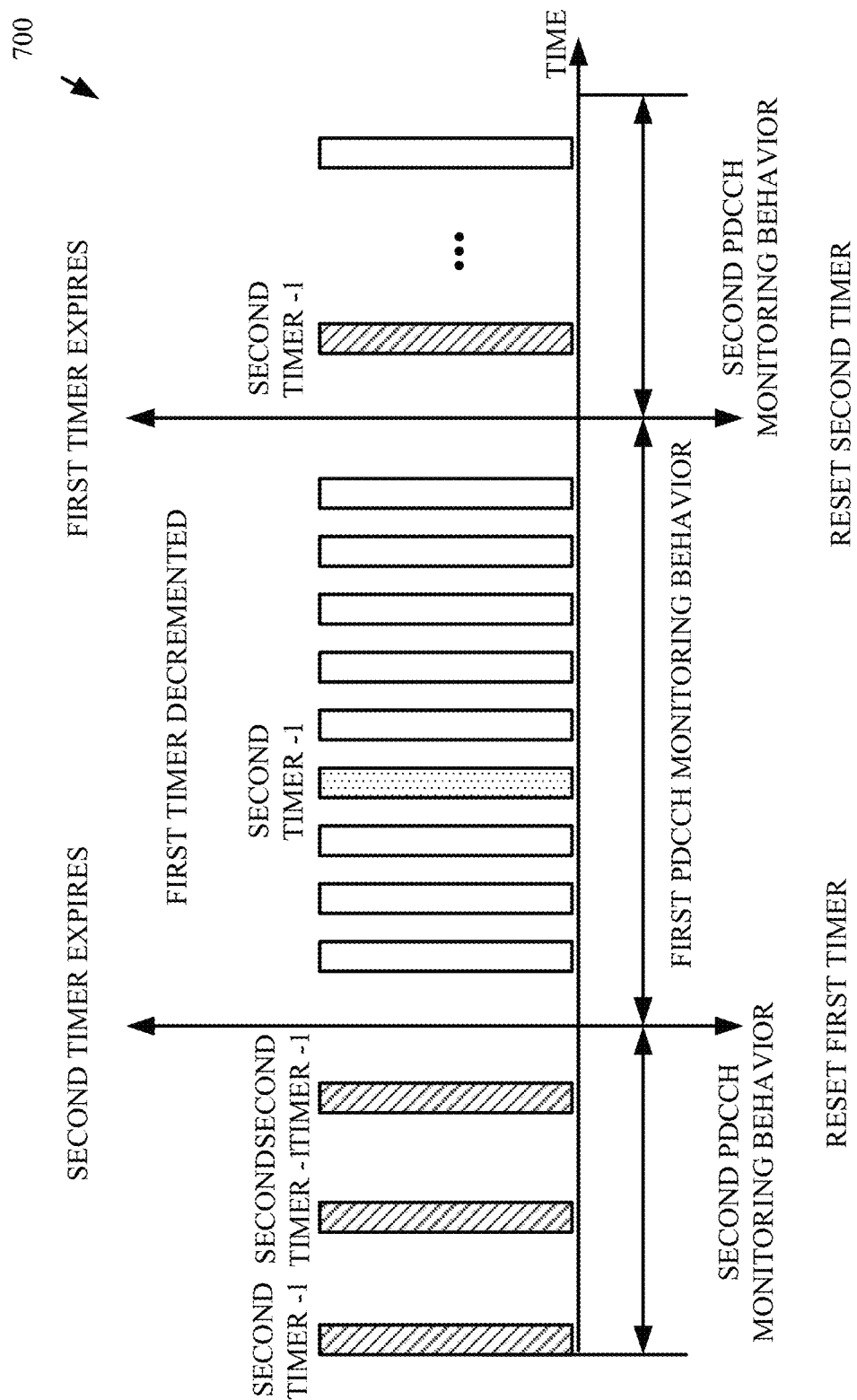
FIG. 7 is an example block diagram of two-level timer-based event triggering PDCCH monitoring behavior transition between two PDCCH monitoring behaviors with self-circulation.

FIG. 7 is an example block diagram 700 of two-level timer-based event triggering PDCCH monitoring behavior transition between two PDCCH monitoring behaviors with self-circulation. A second method can include PDCCH monitoring behavior transitions among multiple PDCCH monitoring behaviors.

In some embodiments, the unit of the first timer is ms which represents a consecutive time. In some embodiments, the unit of the second timer is an integer which represents the number of a specific PDCCH detected by the UE during the first timer duration. In some embodiments, the second timer is decremented in the units of a reference SCS. In some embodiments, the minimum gap between the two adjacent first timer values is not smaller than 0.125 millisecond (ms). In some embodiments, the minimum gap between the two available second timer values is not smaller than 1. In some embodiments, the first timer and the second timer are configured per UE. In some embodiments, the first timer and the second timer are configured per serving cell group. In some embodiments, the second timer is predefined as 1.

In some embodiments, the number of candidate PDCCH monitoring behaviors is N. The monitoring frequency of the candidate PDCCH monitoring behaviors for the specific search space type may be different. The candidate PDCCH monitoring behaviors may be ordered as {1$^{st}$ PDCCH monitoring behavior, 2$^{nd}$ PDCCH monitoring behavior, 3$^{rd}$ PDCCH monitoring behavior, . . . , N$^{th}$ PDCCH monitoring behavior} with the monitoring frequency from large to small based on the value of the monitoring frequency. The specific search space type may include at least one the type-3 common search space and the UE-specific search space.

In some embodiments, the PDCCH monitoring behavior transitions from the (n−1)$^{th}$ PDCCH monitoring behavior to the n$^{th}$ PDCCH monitoring behavior when the first timer is decremented to a value equal to a threshold $S_{n-1}$. The threshold $S_{n-1}$ may be related to the first timer and has the same unit with the first timer.

In some embodiments, the PDCCH monitoring behavior transitions from the n$^{th}$ PDCCH monitoring behavior to the (n−1)$^{th}$ PDCCH monitoring behavior when the second timer is decremented to a value equal to a threshold $D_{n-1}$. The threshold $D_{n-1}$ may be related to the second timer and has the same unit with the second timer.

The threshold for the first timer $\{S_1, S_2, \ldots, S_{n-1}\}$ may be satisfied with $S_1 > S_2 > \ldots > S_{n-1}$. The threshold for the second timer $\{D_1, D_2, \ldots, D_{n-1}\}$ may be satisfied with $D_1 < D_2 < \ldots < D_{n-1}$.

In some embodiments, the DCI can use 1 bit to indicate PDCCH monitoring behavior transition among multiple PDCCH monitoring behaviors. It can reduce the overhead of the L1 signaling.

In some embodiments, the DCI can use ceil(log 2(N)) bit(s) to indicate PDCCH monitoring behavior transition among multiple PDCCH monitoring behaviors. It can indicate the UE switch PDCCH monitoring behavior among multiple PDCCH monitoring behaviors more flexibly.

In some embodiments, the PDCCH monitoring behavior transitions from the 1$^{st}$ PDCCH monitoring behavior to the n$^{th}$ PDCCH monitoring behavior when the first timer is decremented to a value equal to 0. In some embodiments, the PDCCH monitoring behavior transitions from the n$^{th}$ PDCCH monitoring behavior to the 1st PDCCH monitoring behavior when the second timer is decremented to a value equal to 0.

In some embodiments, the first timer and the second timer are reset when the second timer is expired if the UE monitors PDCCH according to the first PDCCH monitoring behaviors. In some embodiments, the UE can switch the PDCCH monitoring behavior from the current PDCCH monitoring behavior to the first PDCCH monitoring behavior and the first timer is reset when the second timer is expired. Wherein the current PDCCH monitoring behavior can be one PDCCH monitoring behavior among the PDCCH monitoring behaviors except for the $1^{st}$ PDCCH monitoring behavior.

Example Embodiment 7

There may be four candidate PDCCH monitoring behaviors configured for the UE. The monitoring frequency fs of the four PDCCH monitoring behaviors may be satisfied with that $fs^{1st} > fs^{2nd} > fs^{3rd} > fs^{4th}$. The UE can be indicated to switch PDCCH monitoring behavior by the DCI with one bit. The value of the one bit can indicate the UE to switch to a PDCCH monitoring behavior between different two PDCCH monitoring behaviors. Wherein the threshold of the first timer $\{S_1, S_2, S_3\}$ is satisfied with $S_1 > S_2 > S_3$ and $S_3 > 0$. For different types of PDCCH monitoring behaviors, the DCI indication value of the PDCCH monitoring behavior transition can represent different information and the switched PDCCH monitoring behavior triggered by the DCI is determined by both the indication of the DCI and the current PDCCH monitoring behavior.

For example, if the UE monitors PDCCH according to the first PDCCH monitoring behavior and the DCI indicates a '0' value, the UE can switch the PDCCH monitoring behavior to the fourth PDCCH monitoring behavior. Otherwise, if the UE monitors PDCCH according to the first PDCCH monitoring behavior and the DCI indicates a '1' value, the UE can switch the PDCCH monitoring behavior to the second PDCCH monitoring behavior.

For example, if the UE monitors PDCCH according to the third PDCCH monitoring behavior and the DCI indicates a '0' value, the UE can switch the PDCCH monitoring behavior to the fourth PDCCH monitoring behavior. Otherwise, if the UE monitors PDCCH according to the first PDCCH monitoring behavior and the DCI indicates a '1' value, the UE can switch the PDCCH monitoring behavior to the first PDCCH monitoring behavior. This method can not only help the UE adapt to the multiple PDCCH monitoring behaviors but also reduce the overhead of the L1 signaling with 1-bit indication.

Figure 8:
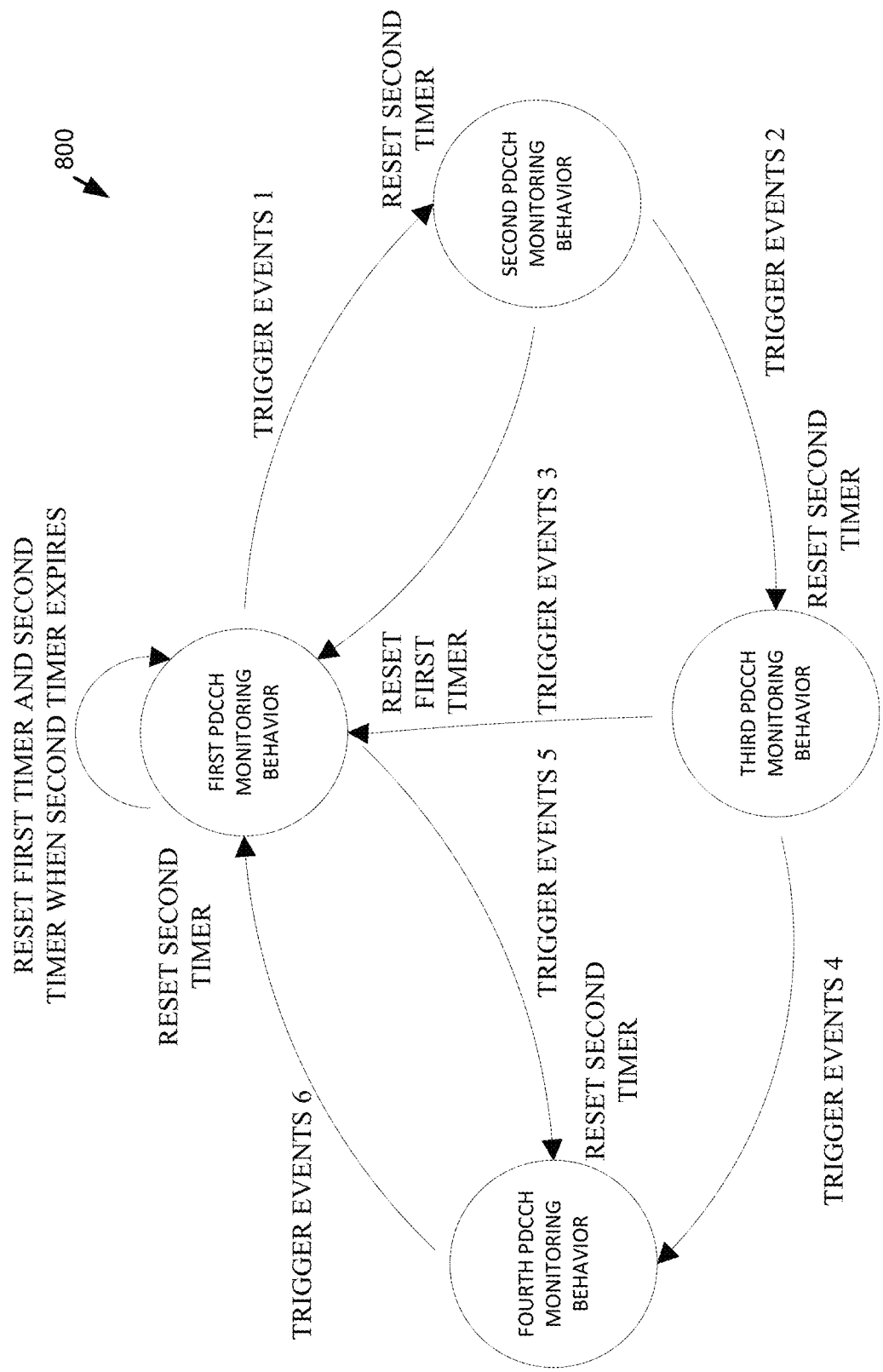
FIG. 8 is an example block diagram of two-level timer event triggering PDCCH monitoring behavior transition among multiple PDCCH monitoring behaviors.

FIG. 8 is an example block diagram 800 of two-level timer event triggering PDCCH monitoring behavior transition among multiple PDCCH monitoring behaviors. In some embodiments, the first timer and the second timer are reset when the first timer is expired if the UE monitors PDCCH according to the $n^{th}$ PDCCH monitoring behavior. In some embodiments, the UE can switch the PDCCH monitoring behavior from the current PDCCH monitoring behavior to the $n^{th}$ PDCCH monitoring behavior and the second timer is reset when the first timer is expired. The current PDCCH monitoring behavior can be one PDCCH monitoring behavior from the $1^{st}$ PDCCH monitoring behavior to $(n-1)^{th}$ PDCCH monitoring behavior.

Example Embodiment 8

There are four candidate PDCCH monitoring behaviors configured for the UE. Wherein the monitoring frequency fs of the four PDCCH monitoring behaviors is satisfied with that $fs^{1st} > fs^{2nd} > fs^{3rd} > fs^{4th}$. The UE can be indicated to switch PDCCH monitoring behavior by the DCI with one bit. The value of the one bit can indicate the UE to switch to a PDCCH monitoring behavior between different two PDCCH monitoring behaviors. Wherein the threshold of the second timer $\{D_1, D_2, D_3\}$ is satisfied with $D_1 > D_2 > D_3$ and $D_3 > 0$. For different type of PDCCH monitoring behaviors, the DCI indication value of the PDCCH monitoring behavior transition can represents different information and the switched PDCCH monitoring behavior triggered by the DCI is determined by both the indication of the DCI and the type of current PDCCH monitoring behavior.

For example, if the UE monitors PDCCH according to the fourth PDCCH monitoring behavior and the DCI indicates a '0' value, the UE can switch the PDCCH monitoring behavior to the third PDCCH monitoring behavior. Otherwise, if the UE monitors PDCCH according to the first PDCCH monitoring behavior and the DCI indicates a '1' value, the UE can switch the PDCCH monitoring behavior to the first PDCCH monitoring behavior.

For example, if the UE monitors PDCCH according to the third PDCCH monitoring behavior and the DCI indicates a '0' value, the UE can switch the PDCCH monitoring behavior to the fourth PDCCH monitoring behavior. Otherwise, if the UE monitors PDCCH according to the first PDCCH monitoring behavior and the DCI indicates a '1' value, the UE can switch the PDCCH monitoring behavior to the second PDCCH monitoring behavior. This method can not only help the UE adapt to the multiple PDCCH monitoring behaviors but also reduce the overhead of the L1 signaling with 1-bit indication.

Figure 9:
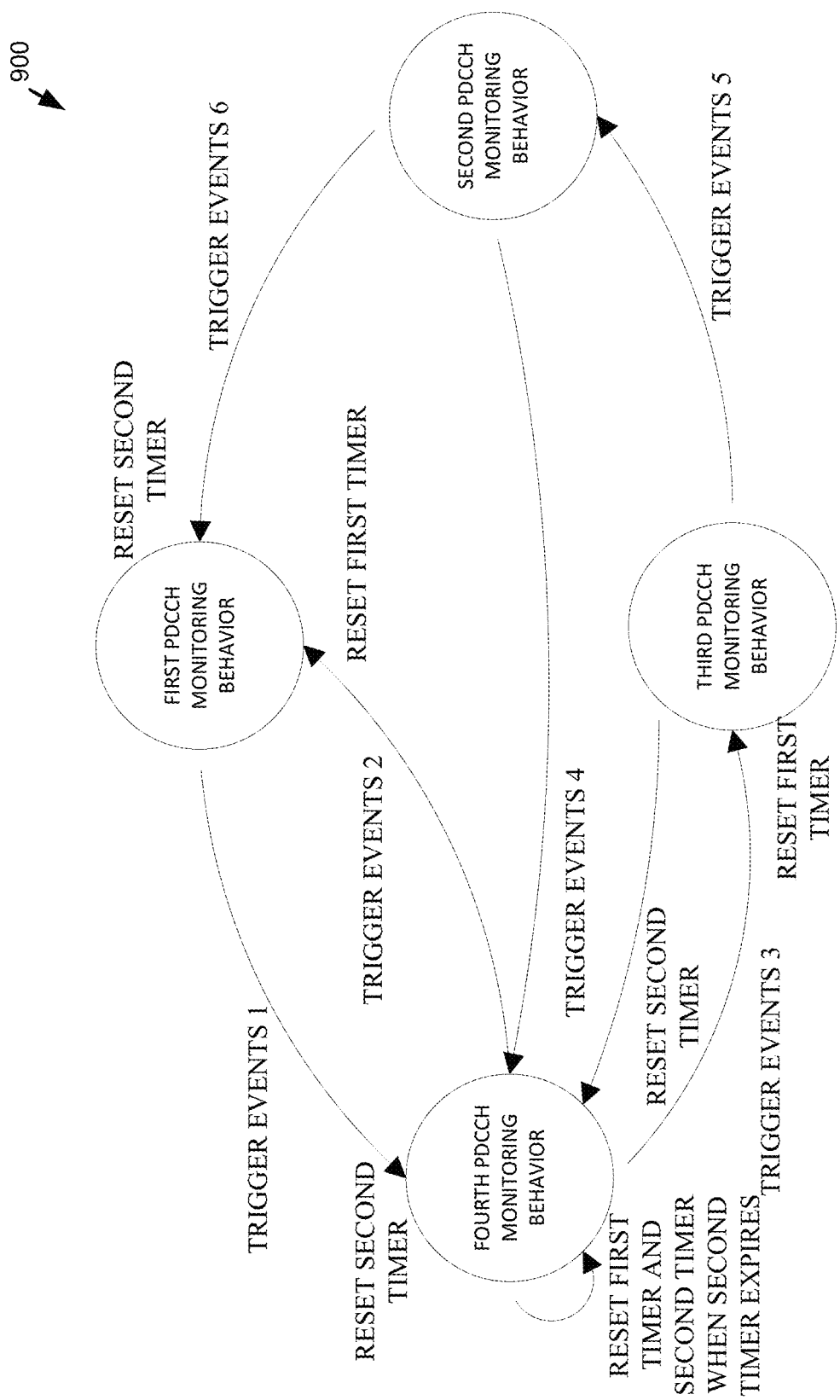
FIG. 9 is an example block diagram of two-level timer event triggering PDCCH monitoring behavior transition among multiple PDCCH monitoring behaviors.

FIG. 9 is an example block diagram 900 of two-level timer event triggering PDCCH monitoring behavior transition among multiple PDCCH monitoring behaviors. The PDCCH monitoring behavior can transition from the first PDCCH monitoring behavior to the second PDCCH monitoring behavior when the first timer is decremented to 0. The PDCCH monitoring behavior can transition from the second PDCCH monitoring behavior to the first PDCCH monitoring behavior when the second timer is decremented to 0.

In some embodiments, the second timer value is reset when the first timer is decremented to 0 or expired.

A third method can include the timer triggering to reduce monitoring a portion of search space sets of the PDCCH monitoring behavior or indicate the scaling factor for the parameters of the PDCCH monitoring behavior.

In some embodiments, the timer or a DCI can trigger the UE to monitor PDCCH according to a portion of search space sets of the current PDCCH monitoring behavior. In some embodiments, the first timer triggers the UE to monitor PDCCH according to a portion of search space sets of the second PDCCH monitoring behavior. In some embodiments, the second timer triggers the UE to monitor PDCCH according to a portion of search space sets of the first PDCCH monitoring behavior.

In some embodiments, the timer can trigger the UE to monitor PDCCH according to the search space sets of the current PDCCH monitoring behavior with at lease one of the parameters modified by a scaling factor. Wherein the parameters include Ts, ks, Os, and fs.

The first timer can trigger the UE to switch the current PDCCH monitoring behavior to the other PDCCH monitoring behavior. One of the parameters of the current PDCCH monitoring behavior may be modified by a scaling factor to generate the other PDCCH monitoring behavior.

In some embodiments, the scaling factor may not be larger than 1 and is used to product PDCCH monitoring periodicity ks, duration Ts, or the PDCCH monitoring offset Os.

The PDCCH monitoring behavior may transition from the first PDCCH monitoring behavior to the second PDCCH monitoring behavior when the first timer is decremented to a threshold.

The PDCCH monitoring behavior can transition from the second PDCCH monitoring behavior to the first PDCCH monitoring behavior when the second timer is decremented to a threshold. The threshold can include the value of 0 or the value of the first timer or the second timer configured by the high layer parameter.

In this the present embodiments, the application time for the PDCCH monitoring behavior switching is not larger than the maximum value between 1 ms and the BWP switching delay.

Example Embodiment 9

Example Embodiment 9 can relate to timer triggering restriction. The first timer may be decremented based on a consecutive duration.

In some embodiments, the UE decrements/increases the first timer value by one after each slot in the active DL BWP of the serving cell without DRX configuration. In some embodiments, the UE decrements the first timer value by one after each slot in the active DL BWP of the serving cell where the UE is in Active Time with DRX configuration. In some embodiments, the first timer value is reset when the UE switches from outside Active Time to Active Time.

The first timer may be decremented based on a consecutive monitoring occasions. In some embodiments, the UE decrements/increases the first timer value by one after each slot in the active DL BWP of the serving cell where the UE monitors PDCCH during the monitoring occasions according to at least one of the following search space set: common search space set, UE-specific search space set.

In some embodiments, the UE decrements/increases the first timer value by one after each slot in the active DL BWP of the serving cell where the UE monitors PDCCH during the monitoring occasions according to at least one of the following DCI format: DCI format 0-0 and/or DCI format 1-0, DCI format 0-1 and/or DCI format 1-1, DCI format 0-2 and/or DCI format 1-2, DCI format 3-0, DCI format 3-1, DCI format 2-0.

The first timer may be decremented based on a consecutive monitoring periodicity. In some embodiments, the UE decrements/increases the first timer value by one after each slot in the active DL BWP of the serving cell where the UE monitors PDCCH at the first slot of the monitoring periodicity ks according to at least one of the following search space set: common search space set, UE-specific search space set.

In some embodiments, the UE decrements/increases the first timer value by one after each slot in the active DL BWP of the serving cell where the UE monitors PDCCH at the first slot of the monitoring periodicity ks according to at least one of the following DCI format: DCI format 0-0 and/or DCI format 1-0, DCI format 0-1 and/or DCI format 1-1, DCI format 0-2 and/or DCI format 1-2, DCI format 3-0, DCI format 3-1, DCI format 2-0.

The first timer may be decremented based on a uniform time unit. In some embodiments, the UE decrements/increases the first timer value by one after each millisecond (ms) in the active DL BWP of the serving cell. The serving cell may include the primary serving cell (PCell and SpCell) and all of the scheduled SCells in the SCell group.

The second timer may be decremented based on any of multiple events. In some embodiments, the UE decrements/increases the second timer value by one after each slot in the active DL BWP of the serving cell where the UE monitors PDCCH for detection of the DCI formats in the common search space and/or the UE-specific search space.

In some embodiments, the UE decrements/increases the second timer value by one after each slot in the active DL BWP of the serving cell where the UE monitors PDCCH for detection of at least one of the following DCI format: DCI format 0-0 and/or DCI format 1-0, DCI format 0-1 and/or DCI format 1-1, DCI format 0-2 and/or DCI format 1-2, DCI format 3-0, DCI format 3-1, DCI format 2-0.

In some embodiments, the UE decrements/increases the second timer value by one after each slot in the active DL BWP of the serving cell where the UE monitors PDCCH for detection of at least one of the DCI format that can indicate the function of PDCCH monitoring behavior transition.

In some embodiments, the UE decrements/increases the second timer value by one after each slot in the active DL BWP of the serving cell where the UE monitors PDCCH for detection of at least one of the DCI format that can schedule a DL/UL data transmission.

PDCCH monitoring behavior switching is applied search space:

In some embodiments, the PDCCH monitoring behavior can include the type-3 common search space set or the UE-specific search space set. In some embodiments, the PDCCH monitoring behavior switching can be used for monitoring PDCCH belonged to the type-3 common search space or the UE-specific search space. In some embodiments, the first timer and the second timer can used for the case that the DRX is configured.

In some embodiments, the first timer and the second timer can used for the case that the PDCCH monitoring behavior transitioning functionality can be indicated by the DCI. In some embodiments, the first timer and the second timer may not be used for the case that the UE performs BWP switching. In some embodiments, when the first timer or the second timer is expired, the UE performs PDCCH monitoring according to the switched PDCCH monitoring behavior after the end slot of the frame for FR1 and the subframe for FR2.

In some embodiments, the first timer or the second timer can be stopped by a higher layer parameter. In some embodiments, the timer can be stopped after the slot where the drx-Inactivity timer is expired. In some embodiments, the second timer can be stopped after the slot where the drx-onDuration timer is expired.

A first method can include, when the timer is stopped by a higher layer parameter, the UE can switch to a default PDCCH monitoring behavior. The default PDCCH monitoring behavior may be the search space set group with a default group index.

In some embodiments, the default group index is the index that is smaller than the number of search space set groups configured by the higher layer parameter.

In some embodiments, the default group index is the lowest index of the configured search space set groups.

A second method may include, when the timer is stopped by a higher layer parameter, the UE can monitor PDCCH according to the current PDCCH monitoring behavior. In some embodiments, the first timer or the second timer can be reset by a higher layer parameter. In some embodiments, the first timer or the second timer only running in the active DL BWP.

Figure 10:
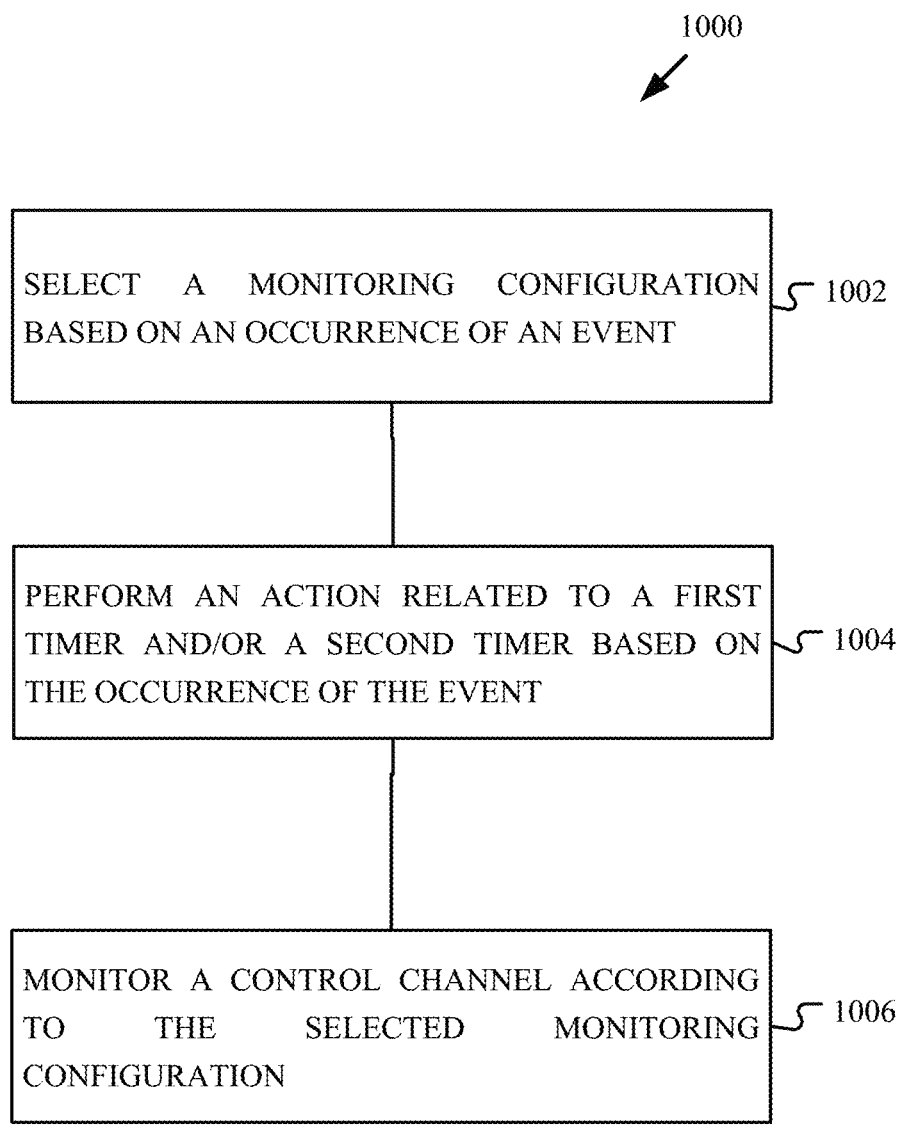
FIG. 10 is a block diagram of an example method for a control channel monitoring procedure.

FIG. 10 is a block diagram 1000 of an example method for a control channel monitoring procedure. The method can also include selecting, by the terminal, a monitoring configuration based on an occurrence of an event (block 1002).

The method can also include performing, by the terminal, an action relating to a first timer and/or a second timer based on the occurrence of the event (block 1004). The method can also include monitoring, by the terminal, a control channel according to the selected monitoring configuration (block 1006).

In some embodiments, the first timer is decremented or increased by one after a millisecond or a slot for a reference subcarrier spacing (SCS).

In some embodiments, the reference SCS includes a minimum or maximum SCS among multiple SCSs of all configured downlink bandwidth part (BWP) in a configured serving cell or serving cell group for the terminal.

In some embodiments, the second timer is decremented or increased by one after the terminal detects a specific physical downlink control channel (PDCCH).

In some embodiments, the specific PDCCH is included in the type-3 common search space set or UE-specific search space set.

In some embodiments, the monitoring configuration includes a group of search space sets that are configured by a higher layer parameter.

In some embodiments, a parameters for the selected monitoring configuration includes at least one of the following: a search space type, a PDCCH monitoring frequency, a PDCCH monitoring occasion granularity, a number of available symbols within a slot for PDCCH monitoring, a PDCCH monitoring periodicity, a PDCCH monitoring offset, and/or a duration that is not smaller than 0, wherein the PDCCH monitoring frequency represents a value of the duration divided by the PDCCH monitoring periodicity, and wherein the PDCCH monitoring granularity represents a number of monitoring occasions for a total number of search space sets during the PDCCH monitoring periodicity.

In some embodiments, the monitoring configuration includes a first monitoring configuration and a second monitoring configuration.

In some embodiments, the second monitoring configuration includes any of: a larger monitoring periodicity than that of the first monitoring configuration, a larger monitoring offset than that of the first monitoring configuration, a smaller monitoring duration than that of the first monitoring configuration, a smaller number of available symbols than that of the first monitoring configuration, a smaller number of PDCCH monitoring occasions than that of the first monitoring configuration, a smaller monitoring occasion granularity than that of the first monitoring configuration, and a smaller monitoring frequency than that of the first monitoring configuration.

In some embodiments, the occurrence of the event includes an expiration of the first timer or the second timer or detecting downlink control information (DCI) by the terminal.

In some embodiments, the terminal can monitor PDCCH according to the selected monitoring configuration.

In some embodiments, the DCI indicates a monitoring configuration that is different from the current monitoring configuration for the terminal; and the terminal selects the indicated monitoring configuration. In some embodiments, if the terminal monitors PDCCH according to a current first monitoring configuration and the first timer expires or DCI indicates a second monitoring configuration, the terminal performs an action of stopping decrementing or increasing the first timer and selecting a second monitoring configuration. Wherein the terminal shall monitor PDCCH according to the selected second monitoring configuration.

In some embodiments, if the terminal monitors PDCCH according to a current first monitoring configuration and the first timer expires or DCI indicates a second monitoring configuration, the terminal performs an action of resetting the value of the second timer and selects a second monitoring configuration. Wherein the terminal shall monitor PDCCH according to the selected second monitoring configuration.

In some embodiments, if the terminal monitors PDCCH according to a current second monitoring configuration and the second timer expires or DCI indicates a first monitoring configuration, the terminal performs an action of stopping decrementing or increasing the second timer and selects a first monitoring configuration. Wherein the terminal shall monitor PDCCH according to the selected first monitoring configuration.

In some embodiments, if the terminal monitors PDCCH according to a current second monitoring configuration and the second timer expires or DCI indicates a first monitoring configuration, and wherein the terminal performs an action of resetting the value of the first timer and selects a first monitoring configuration. Wherein the terminal shall monitor PDCCH according to the selected first monitoring configuration.

In some embodiments, the expiration of the first timer or the second timer includes decrementing or increasing the first timer or the second timer to a threshold value.

In some embodiments, the terminal performs an action of resetting the value of the first timer if the terminal switches the first monitoring configuration to the second monitoring configuration or the second timer expires.

In some embodiments, the terminal performs an action of resetting the value of the second timer if the terminal switches the second monitoring configuration to the first monitoring configuration or the first timer expires.

In some embodiments, the first timer is reset to a value of the first timer configured by the higher layer parameter.

In some embodiments, the second timer is reset to a value of the second timer configured by the higher layer parameter.

In some embodiments, the second timer is reset to 1.

In some embodiments, the DCI corresponds to a DCI format 2-0 and includes an indication to switch a group of search space sets, wherein the group of search space sets corresponds to a type-3 search space set or a terminal-specific search space set.

In some embodiments, a field of slot format indicator (SFI) included in the DCI format 2-0 is presented based on at least one of the following conditions: an available resource block (RB)-set indicator is not configured and a channel occurrence time (COT) duration indicator is not configured; the available RB-set indicator is not configured and the COT duration indicator is configured; the available RB-set indicator is configured and the COT duration indicator is configured; and a flag is indicated or configured that the SFI is presented, wherein the flag is used to indicate whether the SFI field is presented or not presented in the DCI format 2-0.

In some embodiments, the flag is not presented if the capability of the terminal does not configured the terminal to support to detect a DCI format 2-0 including the field of the flag In some embodiments, the field indicating search space set group switching is presented if the flag is configured by a higher layer parameter.

In some embodiments, the monitoring configuration includes a portion of the search space sets in a search space set group configured by a higher layer parameter.

In some embodiments, the monitoring configurations in a search space set group have different threshold values, wherein the value of PDCCH monitoring periodicity is larger than a threshold value, and/or the value of duration is smaller than the threshold value, and/or the maximum monitoring frequency is smaller than the threshold value.

In some embodiments, if the first timer expires, the terminal selects a monitoring configuration with the parameters modified by a scaling factor, wherein the scaling factor that is smaller than 1 for multiplying and is larger than 1 for multiplying the duration.

In some embodiments, if the second timer expires, the terminal selects the monitoring configuration with the parameters modified by a scaling factor, wherein the scaling factor is larger than 1 for multiplying the PDCCH monitoring periodicity and is smaller than 1 for multiplying the duration.

In some embodiments, a minimum gap between two candidate values of the first timer is not smaller than 0.125 millisecond, and a minimum gap between two candidate values of the second timer is not smaller than 1.

In some embodiments, the method includes resetting, by the terminal, the first timer or the second timer based on at least one of the following: a discontinuous reception (DRX) inactivity timer expires, a drx-onDuration timer expires, and a DCI indicating PDCCH monitoring configuration switching.

In some embodiments, the first timer can be a drx-onDuration timer or a drx-Inactivity timer if DRX is configured by the terminal.

In some embodiments, the threshold value is equal to 0.

In some embodiments, the first timer and/or the second timer are configured for a serving cell or configured for a serving cell group when the serving cell group is configured.

Example Wireless System

Figure 11:
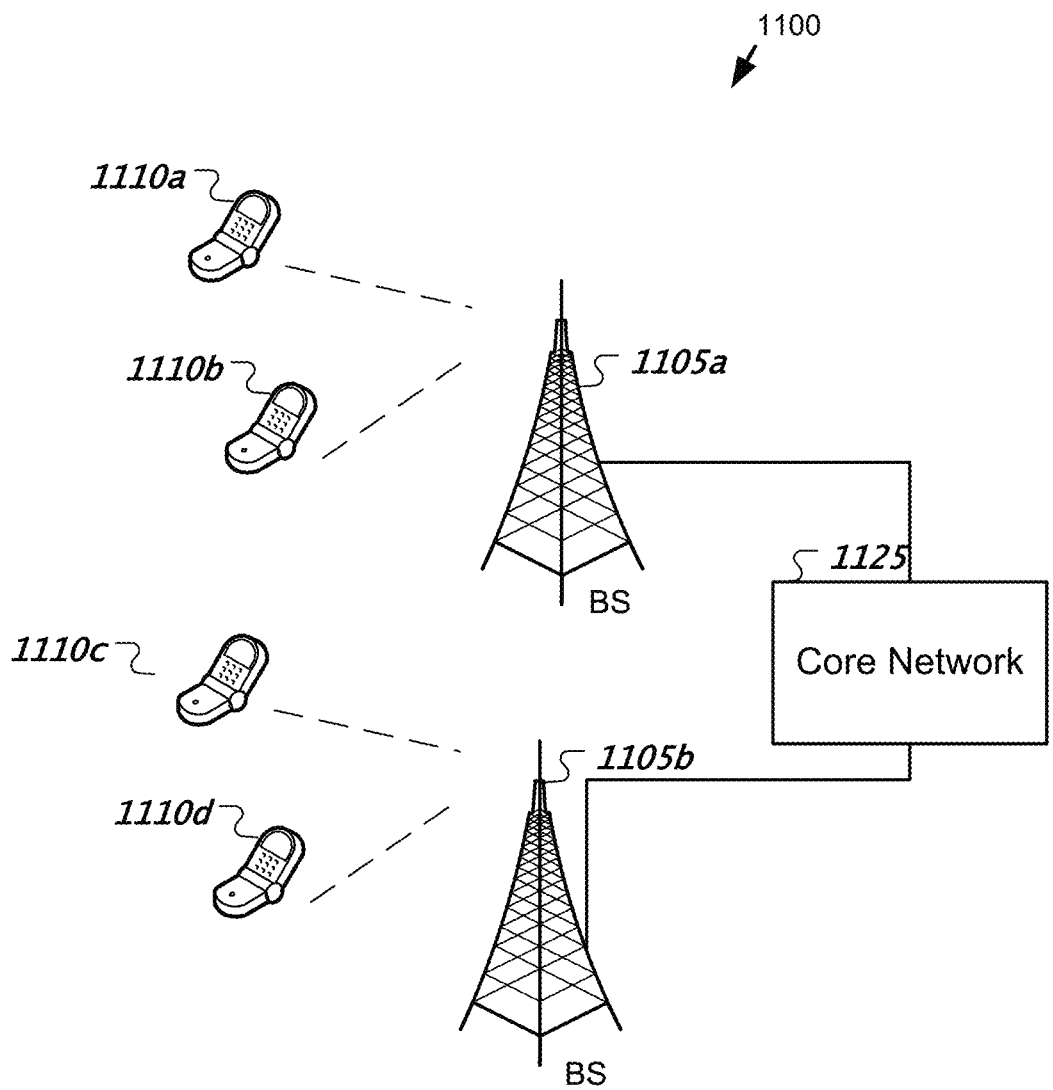
FIG. 11 shows an example of a wireless communication system where techniques in accordance with one or more embodiments of the present technology can be applied.

FIG. 11 shows an example of a wireless communication system where techniques in accordance with one or more embodiments of the present technology can be applied. A wireless communication system 1100 can include one or more base stations (BSs) 1105a, 1105b, one or more wireless devices or terminals 1110a, 1110b, 1110c, 1110d, and a core network 1125. A base station 1105a, 1105b can provide wireless service to wireless devices 1110a, 1110b, 1110c and 1110d in one or more wireless sectors. In some implementations, a base station 1105a, 1105b includes directional antennas to produce two or more directional beams to provide wireless coverage in different sectors. The base station may implement functionalities of a scheduling cell or a candidate cell, as described in the present document.

The core network 1125 can communicate with one or more base stations 1105a, 1105b. The core network 1125 provides connectivity with other wireless communication systems and wired communication systems. The core network may include one or more service subscription databases to store information related to the subscribed wireless devices 1110a, 1110b, 1110c, and 1110d. A first base station 1105a can provide wireless service based on a first radio access technology, whereas a second base station 1105b can provide wireless service based on a second radio access technology. The base stations 1105a and 1105b may be co-located or may be separately installed in the field according to the deployment scenario. The wireless devices 1110a, 1110b, 1110c, and 1110d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 12:
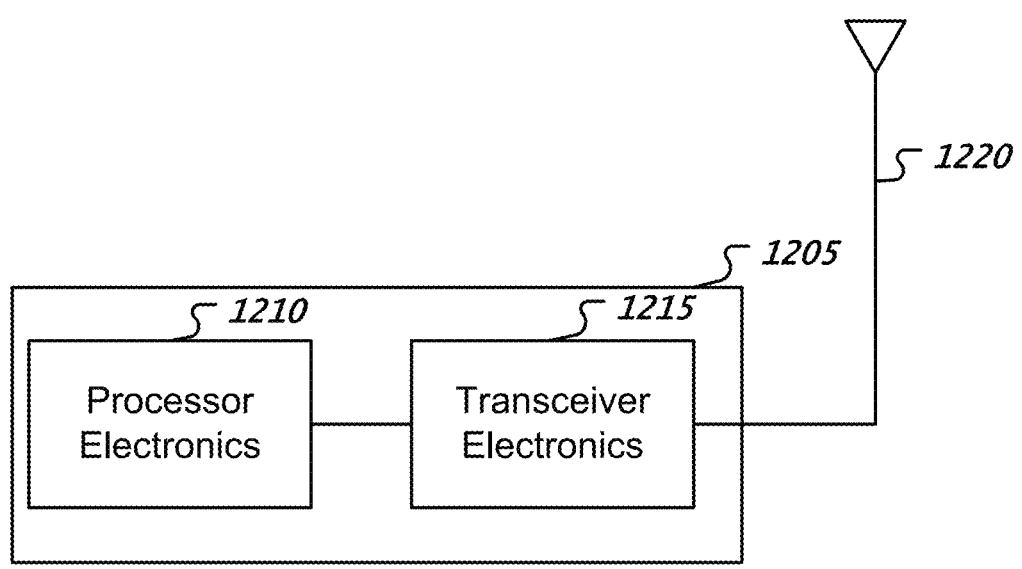
FIG. 12 is a block diagram representation of a portion of a hardware platform.

FIG. 12 is a block diagram representation of a portion of a hardware platform. A hardware platform 1205 such as a network node or a base station or a terminal or a wireless device (or UE) can include processor electronics 1210 such as a microprocessor that implements one or more of the techniques presented in this document. The hardware platform 1205 can include transceiver electronics 1215 to send and/or receive wired or wireless signals over one or more communication interfaces such as antenna 1220 or a wireline interface. The hardware platform 1205 can implement other communication interfaces with defined protocols for transmitting and receiving data. The hardware platform 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the hardware platform 1205.

CONCLUSION

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   selecting, by a terminal configured to maintain a first timer and a second timer for triggering the terminal to switch monitoring configurations, a monitoring configuration based on an occurrence of a trigger event for switching monitoring configurations, wherein the first timer is configured with a minimum gap between two adjacent values that is not smaller than 0.125 milliseconds;
   resetting, by the terminal, at least one of a value of the first timer or a value of the second timer based on the occurrence of the trigger event; and
   monitoring, by the terminal, a control channel according to the selected monitoring configuration.

2. The method of claim 1, wherein the value of the first timer is decremented or increased by one after a millisecond or a slot for a reference subcarrier spacing (SCS), and wherein the reference SCS is a minimum SCS among multiple SCSs of all configured downlink bandwidth parts (BWPs) in a configured serving cell or serving cell group for the terminal.

3. The method of claim 1, wherein the value of the second timer is decremented or increased by one after the terminal detects a specific physical downlink control channel (PDCCH).

4. The method of claim 3, wherein the specific PDCCH is included in a type-3 common search space set or a UE-specific search space set.

5. The method of claim 1, wherein the monitoring configuration includes a group of search space sets that are configured by a higher layer parameter.

6. The method of claim 1, wherein a parameter for the selected monitoring configuration includes at least one of the following: a search space type, a PDCCH monitoring frequency, a PDCCH monitoring occasion granularity, a number of available symbols within a slot for PDCCH monitoring, a PDCCH monitoring periodicity, a PDCCH monitoring offset, and/or a duration that is not smaller than 0, wherein the PDCCH monitoring frequency represents a value of the duration divided by the PDCCH monitoring periodicity, and wherein the PDCCH monitoring granularity represents a number of monitoring occasions for a total number of search space sets during the PDCCH monitoring periodicity.

7. The method of claim 1,
   wherein the monitoring configuration includes a first monitoring configuration and a second monitoring configuration, and
   wherein the second monitoring configuration includes any of: a larger monitoring periodicity than that of the first monitoring configuration, a larger monitoring offset than that of the first monitoring configuration, a smaller monitoring duration than that of the first monitoring configuration, a smaller number of available symbols than that of the first monitoring configuration, a smaller number of PDCCH monitoring occasions than that of the first monitoring configuration, a smaller monitoring occasion granularity than that of the first monitoring configuration, and a smaller monitoring frequency than that of the first monitoring configuration.

8. The method of claim 1, wherein the occurrence of the trigger event includes an expiration of the first timer or the second timer or detecting, by the terminal, downlink control information (DCI) that indicates a monitoring configuration that is different from a current monitoring configuration for the terminal; and wherein the terminal selects the indicated monitoring configuration.

9. The method of claim 5, wherein the monitoring configuration includes a portion of the search space sets in the group of search space sets.

10. The method of claim 9, wherein the group of search space sets has different threshold values for monitoring configurations, wherein a PDCCH monitoring periodicity of the monitoring configuration is larger than a threshold value, a monitoring duration is smaller than the threshold value, and a maximum monitoring frequency of the monitoring configuration is smaller than the threshold value.

11. The method of claim 8, wherein based on the expiration of the first timer, the terminal selects the monitoring configuration including parameters modified by a scaling factor, wherein the scaling factor that is smaller than 1 for multiplying a PDCCH monitoring periodicity of the monitoring configuration and is larger than 1 for multiplying a monitoring duration of the monitoring configuration.

12. The method of claim 8, wherein based on the expiration of the second timer, the terminal selects the monitoring configuration including parameters modified by a scaling factor, wherein the scaling factor is larger than 1 for multiplying a PDCCH monitoring periodicity of the monitoring configuration and is smaller than 1 for multiplying a monitoring duration of the monitoring configuration.

13. The method of claim 1, wherein at least one of the first timer or the second timer are configured for a serving cell or configured for a serving cell group when the serving cell group is configured.

14. An apparatus for wireless communication comprising one or more processors and at least one memory storing instructions that, when executed by the one or more processors, cause the apparatus to:
maintain a first timer and a second timer for triggering switching monitoring configurations, wherein the first timer is configured with a minimum gap between two adjacent values that is not smaller than 0.125 milliseconds;
select a monitoring configuration based on an occurrence of a trigger event for switching monitoring configurations;
reset at least one of a value of the first timer or a value of the second timer based on the occurrence of the trigger event; and
monitor a control channel according to the selected monitoring configuration.

15. The apparatus of claim 14, wherein the value of the first timer is decremented or increased by one after a millisecond or a slot for a reference subcarrier spacing (SCS), and wherein the reference SCS is a minimum SCS among multiple SCSs of all configured downlink bandwidth parts (BWPs) in a configured serving cell or serving cell group.

16. The apparatus of claim 14, wherein the value of the second timer is decremented or increased by one after detecting a specific physical downlink control channel (PDCCH).

17. The apparatus of claim 16, wherein the specific PDCCH is included in a type-3 common search space set or a UE-specific search space set.

18. The apparatus of claim 14, wherein the monitoring configuration includes a group of search space sets that are configured by a higher layer parameter.

19. The apparatus of claim 14, wherein the occurrence of the event includes an expiration of the first timer or the second timer or detecting downlink control information (DCI) that indicates a monitoring configuration that is different from a current monitoring configuration; and wherein selected monitoring configuration is the indicated monitoring configuration of the DCI.

20. At least one non-transitory computer readable medium having code stored thereon, the code when executed by one or more processors, causing the one or more processors to:
maintain a first timer and a second timer for triggering switching monitoring configurations, wherein the first timer is configured with a minimum gap between two adjacent values that is not smaller than 0.125 milliseconds;
select a monitoring configuration based on an occurrence of a trigger event for switching monitoring configurations;
reset at least one of a value of the first timer or a value of the second timer based on the occurrence of the trigger event; and
monitor a control channel according to the selected monitoring configuration.

* * * * *